US009152871B2

(12) United States Patent
Soundararajan et al.

(10) Patent No.: US 9,152,871 B2
(45) Date of Patent: Oct. 6, 2015

(54) MULTIPLE HYPOTHESIS TESTING FOR WORD DETECTION

(71) Applicant: QUALCOMM Incorporated, San Diego, CA (US)

(72) Inventors: Rajiv Soundararajan, Bangalore (IN); Kishor Kumar Barman, Santa Clara, CA (US); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/268,904

(22) Filed: May 2, 2014

(65) Prior Publication Data

US 2015/0063700 A1 Mar. 5, 2015

(30) Foreign Application Priority Data

Sep. 2, 2013 (IN) ........................... 3934/CHE/2013
Dec. 18, 2013 (IN) ........................... 5924/CHE/2013

(51) Int. Cl.
*G06K 9/18* (2006.01)
*G06K 9/34* (2006.01)
*G06K 9/68* (2006.01)
*G06K 9/72* (2006.01)

(52) U.S. Cl.
CPC *G06K 9/18* (2013.01); *G06K 9/344* (2013.01); *G06K 9/6821* (2013.01); *G06K 9/723* (2013.01); *G06K 2209/01* (2013.01)

(58) Field of Classification Search
CPC .................................. G06K 9/18; G06K 9/78
See application file for complete search history.

(56) References Cited

U.S. PATENT DOCUMENTS

| | | | |
|---|---|---|---|
| 8,086,039 B2 | 12/2011 | Kletter | |
| 8,509,536 B2 | 8/2013 | Hwang et al. | |
| 8,571,264 B2 | 10/2013 | Anisimovich et al. | |
| 2010/0310172 A1 | 12/2010 | Natarajan et al. | |

OTHER PUBLICATIONS (Cheng-Lin Liu, "Lexicon-Driven Handwritten Character String Recognition for Japanese Address Reading", Central Research Laboratory, Hitachi, Ltd.).*

(Suryaprakash Kompalli, "Devanagari OCR using a recognition driven segmentation frame work and stochastic language models", 2009, Springer-Verlag 2009).*

(Continued)

*Primary Examiner* — Siamak Harandi

(74) *Attorney, Agent, or Firm* — Silicon Valley Patent Group LLP

(57) ABSTRACT

Embodiments disclosed pertain to Optical Character Recognition using Multiple Hypothesis Testing based techniques on images occurring in a variety of settings, including images captured by mobile stations. In some embodiments, a set of bifurcation points for a character cluster in an image may be determined. The character cluster may comprise non-uniformly spaced text or closely spaced text. A plurality of hypotheses may be determined for the character cluster, where each hypothesis is based on a subset of the bifurcation points and comprises a set of words generated from the character cluster. A plurality of scores corresponding to the plurality of hypotheses may be determined, where each score corresponds to a hypothesis, and a hypothesis may be selected from among the plurality of hypotheses based on a score associated with the selected hypothesis.

20 Claims, 15 Drawing Sheets

(56) References Cited

OTHER PUBLICATIONS (Nicholas R. Howe, "Finding Words in Alphabet soup: Inference on Freedom Character Recognition for Historical Scripts", Dec. 2008, Department of Computer Science, Smith College, Northampton, MA).*

Roubtsova N.S., et al., "Integrated text detection and recognition in natural images," Proc. SPIE 8295, Image Processing: Algorithms and Systems X; and Parallel Processing for Imaging Applications II, 829507, 2012, 21 pages.

Casey R.G., et al., "A survey of methods and strategies in character segmentation", IEEE Transactions on Pattern Analysis and Machine Intelligence. vol. 18. No. 7, Jul. 1, 1996, pp. 690-706, XP055087686. ISSN: 0162-8828.

Howe N R., et al., "Finding words in alphabet soup: Inference on freeform character recognition for historical scripts", Pattern Recognition. Elsevier. GB. vol. 42. No. 12. Dec. 1, 2009. pp. 3338-3347. XP026448272. ISSN: 0031-3203.

International Search Report and Written Opinion—PCT/US2014/053322—ISA/EPO—Feb. 5, 2015.

Kompalli, et al., "Devanagari OCR using a recognition driven segmentation framework and stochastic language models," IJDAR (2009) 12, pp. 123-138.

Sinha R M K., et al., "Hybrid Contextual Text Recognition With String Matching", IEEE Transactions on Pattern Analysis and Machine Intelligence, IEEE Computer Society, USA, vol. 15, No. 9, Sep. 1, 1993. pp. 915-925. XP000915332. ISSN: 0162-8828.

Tulyakov S., et al., "Probabilistic model for segmentation based word recognition with lexicon". Document Analysis and Recognition. 2001. Proceedings. Sixth International Conference on Seattle, WA, USA Sep. 10-13, 2001, Los Aalmitos, CA, USA, IEEE Comput. Soc, US, Sep. 10, 2001, pp. 164-167, XP010560494. DOI: 10.1109/ICDAR.2001.953776 ISBN: 978-0-7695-1263-1.

* cited by examiner

390

420

12 $b_0$ 14 $b_1$ 16 $b_2$

| | | | |
|---|---|---|---|
| मेरा | नाम | श | याम |
| मेरा | नाम | | श्याम |
| मेरा | नामश | | याम |
| मेरा | नामश्याम | | |
| मेरानाम | | श | याम |
| मेरानाम | | | श्याम |
| मेरानामश | | | याम |
| मेरानामश्याम | | | |

$b_0$ $b_1$ $b_2$

424

| | 220 $b_0$ | 222 $b_1$ |
|---|---|---|
| Hell | o | World |
| Hell | | oWorld |
| Hello | | World |
| HelloWorld | | |

592

| String | Word Decoder Likelihood |
|---|---|
| Hell | x |
| o | y |
| World | z |
| oWorld | u |
| Hello | v |
| HelloWorld | t |

594 220 $b_0$ 222 $b_1$

| | | | Hypothesis Score |
|---|---|---|---|
| Hell | o | World | $(x^4y^1z^5)^{1/10}$ |
| Hell | | oWorld | $(x^4u^6)^{1/10}$ |
| Hello | | World | $(v^5z^5)^{1/10}$ |
| HelloWorld | | | (t) |

Fig. 5D

MULTIPLE HYPOTHESIS TESTING FOR WORD DETECTION

CROSS REFERENCE TO RELATED APPLICATIONS

This application claims the benefit of and priority to Indian Patent Application No. 3934/CHE/2013 entitled "Multiple Hypothesis Testing for Word Detection" filed Sep. 2, 2013 under applicable provisions of 35 U.S.C. §119(a)-(d). Further, this application also claims the benefit of and priority to Indian Patent Application No. 5924/CHE/2013 entitled "Multiple Hypothesis Testing for Word Detection" filed Dec. 18, 2013 under applicable provisions of 35 U.S.C. §119(a)-(d). The above-identified Indian Patent Applications are incorporated by reference in their entireties herein.

BACKGROUND

The presence of closely-spaced and/or non-uniformly spaced words in captured images may detrimentally affect the reliability of Optical Character Recognition (OCR) techniques applied to the images. In many OCR approaches, text is recognized in an image by localizing each word and/or character in the image, which is followed by classification and recognition of the word and/or character. When multiple words are printed close to each other, and/or the words are non-uniformly spaced conventional OCR techniques may produce an increased number of errors because characters or character sequences that make up words may be incorrectly clustered. Consequently, an increased error rate may result in the output of the OCR process.

Therefore, there is a need for systems, apparatus and methods that facilitate robust and accurate recovery of closely-spaced and/or non-uniformly spaced words and/or characters reliably.

SUMMARY

In some embodiments, a method may comprise: determining a set of bifurcation points for a character cluster; computing a plurality of scores, each score corresponding to a hypothesis in plurality of hypotheses, wherein each hypothesis in the plurality comprises a set of words generated from the character cluster, based, in part, on a subset of the bifurcation points; and selecting a hypothesis from the plurality of hypotheses based on a score associated with the selected hypothesis.

In another embodiment, an apparatus may comprise a processor configured to: determine a set of bifurcation points for a character cluster; compute a plurality of scores, each score corresponding to a hypothesis in plurality of hypotheses, wherein each hypothesis in the plurality comprises a set of words generated from the character cluster, based, in part, on a subset of the bifurcation points; and select a hypothesis from the plurality of hypotheses based on a score associated with the selected hypothesis.

In a further aspect, an apparatus may comprise processing means, which may further comprise: means for determining a set of bifurcation points for a character cluster; means for computing a plurality of scores, each score corresponding to a hypothesis in plurality of hypotheses, wherein each hypothesis in the plurality comprises a set of words generated from the character cluster, based, in part, on a subset of the bifurcation points; and means for selecting a hypothesis from the plurality of hypotheses based on a score associated with the selected hypothesis.

Disclosed embodiments also pertain to a computer-readable medium comprising instructions, which when executed by a processor, perform a method comprising: determining a set of bifurcation points for a character cluster; computing a plurality of scores, each score corresponding to a hypothesis in plurality of hypotheses, wherein each hypothesis in the plurality comprises a set of words generated from the character cluster, based, in part, on a subset of the bifurcation points; and selecting a hypothesis from the plurality of hypotheses based on a score associated with the selected hypothesis.

Embodiments disclosed also pertain to apparatuses, systems and means capable of implementing the disclosed functionality using a combination of hardware and/or software and/or firmware elements.

Methods disclosed may be implemented on mobile stations and other computing devices. In some embodiments, instructions may be embodied on computer-readable media as program code, which may be read and executed by a processor to perform the disclosed methods.

BRIEF DESCRIPTION OF THE DRAWINGS

FIG. 5D shows an exemplary computation of a normalized score for a character cluster given by characters "Hello World".

DETAILED DESCRIPTION

Embodiments of the invention will be described, by way of example only, with reference to the drawings. Although the drawings show one or more examples using the Brahmi and Roman family of scripts, disclosed embodiments are also applicable to various other writing systems, including Latin/Roman scripts, Cyrillic scripts, abugida scripts, syllabaries, etc. The Brahmi family of scripts is used with writing systems from the Indian Subcontinent and in Central Asia.

Figure 1A:
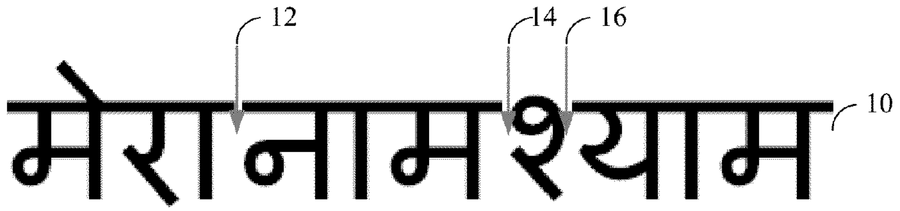
FIG. 1A shows a binarized image for a set of closely spaced characters in the Devanagari script.

FIG. 1A shows a binarized image 10 for a set of closely spaced characters in the Devanagari script. Devanagari is part of the Brahmi family of scripts, and the techniques disclosed may also be applied to other writing systems in the Brahmi family of scripts.

The term closely-spaced as used herein refers generally, to characters that may appear relatively close together in an image. Embodiments disclosed also pertain to OCR on non-uniformly spaced characters. For example, when text images are captured by a camera at an oblique angle, and/or if the surface on which the printed text appears is curved, then one or more characters may be appear closely-spaced and/or non-uniformly spaced.

Text on signboards, road signs, billboards, etc. may be at an oblique angle relative to a user. Accordingly, when an image of the billboard is captured by a camera, such as a camera on a mobile device, text in the image may exhibit non-uniform spacing due to perspective distortion. As another example, pages in an opened book naturally curve towards the spine of the book. Therefore, when an image of a book page is captured, for example, by a scanner or a camera on a mobile device, text spacing may vary and text in the image can appear more closely spaced near the spine relative to text elsewhere on the page. As a further example, when a camera on a Mobile Station (MS) is used to capture an image of a product label, for example, a label on a can or bottle, the natural curvature of the container may contribute to non-uniform spacing of text in the captured image. Therefore, in the exemplary situations above, conventional OCR techniques, which rely on relatively uniform text spacing, may be error-prone. Conventional techniques may limit the applicability of OCR in natural, ad-hoc, and/or unconventional settings when MS' or other devices are used to capture images of natural scenes, because text in the images may appear closely-spaced and/or non-uniformly spaced. Therefore, disclosed embodiments, which facilitate the use of OCR with non-uniformly spaced text, permit OCR to be applied in a greater variety of settings.

As shown in FIG. 1A, the close spacing of characters in binarized image 10 may detrimentally affect conventional OCR processes. For example, it may be difficult to determine an appropriate clustering of the characters, thus, errors or incorrect words may be output by the OCR process. For example, as shown in FIG. 1A, when conventional OCR techniques are applied to binarized image 10 in FIG. 1A, which comprises the Devanagari character cluster "मेरानामश्याम", the binarized output of the conventional process, may not yield the correct word sequence.

Figure 1B:
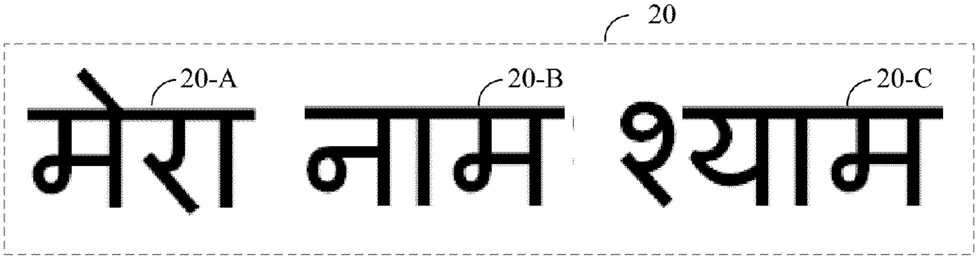
FIG. 1B shows a correct OCR output for a set of closely spaced characters in FIG. 1A.

FIG. 1B shows a correct OCR output 20 for the set of closely spaced characters in image 10. As shown in FIG. 1B, the correct OCR output is given by the word sequence "मेरा नाम श्याम" 20 comprising the words "मेरा" 20-A, "नाम" 20-B, and "श्याम" 20-C, respectively.

Figure 1C:
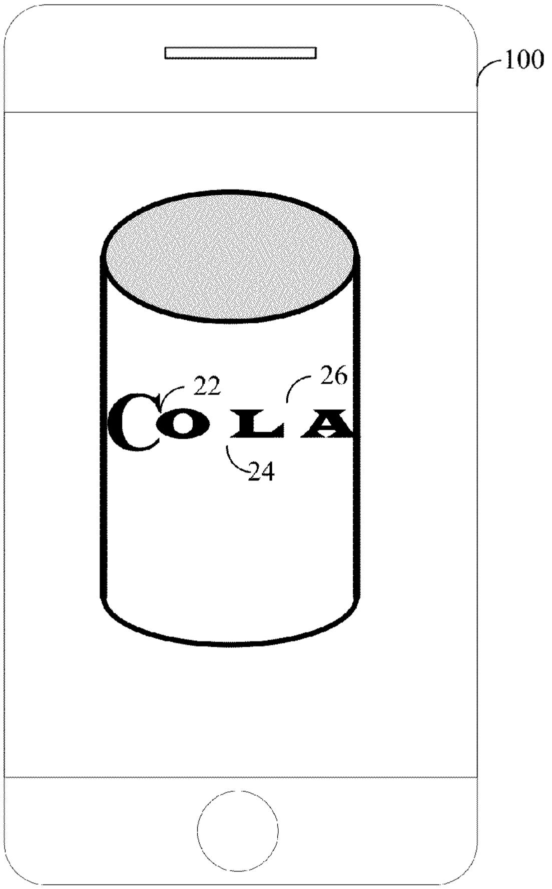
FIG. 1C depicts an image of a can on an exemplary MS with a product label in a Roman script showing non-uniformly spaced text "COLA".

FIG. 1C depicts an image of a can on an exemplary MS 100 with a product label in a Roman script showing non-uniformly spaced text "COLA". As shown in FIG. 1C, in the image, inter-character spacing 24 between letters "O" and "L" appears wider than inter-character spacing 22 between letters "C" and "O", and inter-character spacing 26 between letters "L" and "A". Thus, when conventional OCR techniques are applied to the image in FIG. 1C, the text "COLA" in the image may not be recognized correctly.

Accordingly, disclosed embodiments use a multiple hypotheses testing (MHT) framework, in part, to facilitate the use of OCR in natural and/or unstructured environments when text spacing may be non-uniform. In contrast to techniques where multiple hypotheses are applied to help determine a character from a plurality of segments or text elements, embodiments disclosed herein apply MHT to determine words from a set of non-uniformly spaced characters.

In addition, in conventional OCR techniques, the character decoder, which is relatively computationally intensive, is typically used to identify multifurcation/bifurcation points (hereinafter "bifurcation points") in a set of characters. Bifurcation points refer to locations where a set of characters may be split into two or more text strings. Each bifurcation point may also be characterized by the inter-character separation between a pair of characters that adjoin the bifurcation point. The term inter-character separation or spacing refers to the distance between a pair of adjacent characters in the character cluster. For example, in FIG. 1A, the set of characters "मेरानामश्याम" 10 may be split into the four text strings "मेरा", "नाम", "श", "याम", based on bifurcation points 12, 14 and 16, respectively. Bifurcation point 12 may be characterized by the inter-character separation between adjacent characters "रा" and "ना", which adjoin bifurcation point 12. Similarly, bifurcation point 14 may be characterized by the inter-character separation between adjacent characters "म" and "श", which adjoin bifurcation point 14.

In conventional OCR systems, each incorrect identification of a bifurcation point (e.g. as a consequence of non-uniform character spacing) may result in the re-invocation of the word decoder, which may then attempt to determine a new set of bifurcation points. Therefore, conventional techniques lead to sub-optimal utilization of computational resources and may increase OCR processing time thereby limiting the applicability of such techniques in real-world situations. In contrast, some disclosed embodiments, apply MHT to determine words from a set of non-uniformly spaced characters. In some embodiments, the use of MHT based techniques to determine words from a set of non-uniformly spaced characters may prevent repeated use of the character decoder to determine or re-determine bifurcation points in the same set of characters thereby contributing to computational efficiencies.

Figure 2:
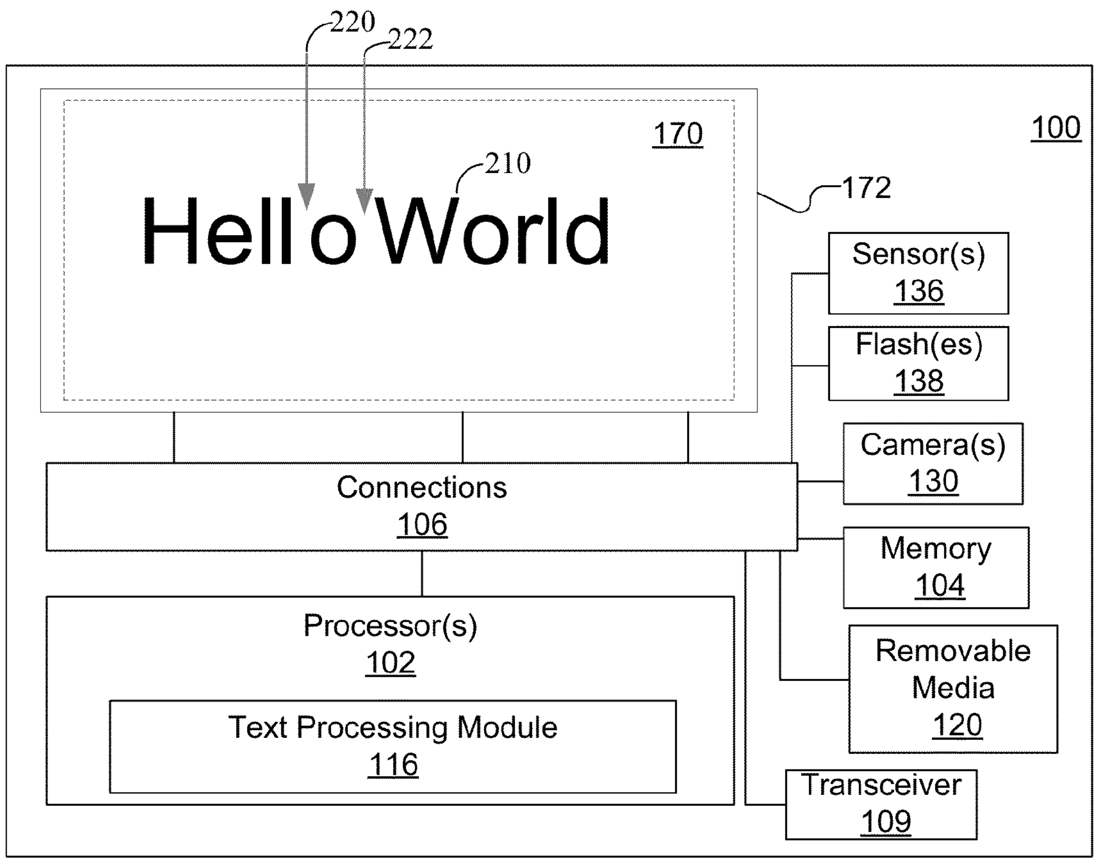
FIG. 2 shows schematic block diagram illustrating certain exemplary features of a Mobile Station (MS) that may be used facilitate robust and accurate recovery of words and/or characters reliably in the presence of non-uniform spacing.

FIG. 2 shows schematic block diagram illustrating certain exemplary features of an exemplary mobile device Mobile Station (MS) 100 that may be used facilitate robust and accurate recovery of words and/or characters reliably in the presence of non-uniform spacing in a manner consistent with embodiments disclosed herein. MS 100 may take the form of a smartphone, handheld computing device, laptop, notebook, tablet computer, portable computer, and/or a gaming device.

The term MS is used broadly to refer to mobile terminals, cell phones, laptop computers, notebook computers, hand-held devices, tablet computers, which may include cameras and/or other imaging devices and one or more processors coupled to the camera that are capable of processing images captured by the camera in a manner consistent with disclosed embodiments. The term MS is also used to refer to standalone devices such as gaming devices, which may include imaging and processing capability but lack communication functionality.

Mobile Station (MS) 100 may, for example, include: one or more processors 102, memory 104, removable media drive 120, display 170, camera(s) 130 and, as applicable, flash 132, various sensors 136, which may be operatively coupled using one or more connections 106 (e.g., buses, lines, fibers, links, etc.). In some embodiments, processors 102 on MS 100 may comprise Text Processing Module 116, which may implement OCR on exemplary image 210 "Hello World" captured by camera(s) 130 in a manner consistent with disclosed embodiments.

In some embodiments, display 170 (shown in FIG. 2 by the dashed block) may permit the display of visual output. Touchscreen 172 may permit users to input data via some combination of virtual keyboards, icons, menus, or other Graphical User Interfaces (GUIs), user gestures and/or input devices such as styli and other writing implements. In some embodiments, touchscreen 172 may overlay display 170, which may concurrently display: input entered by a user; images such as image 210 captured by camera(s) 130; and/or provide other visual feedback based on user input or application output. In one embodiment, a user may employ touchscreen 172 to invoke one or more applications implemented using Text Processing Module 116. For example, the applications may be represented by icons displayed on display 170, and the user may use a displayed icon to invoke a corresponding application. In some embodiments, the output of the application may also be displayed on display 170.

In some embodiments, touchscreen 172 may be implemented, for example, using a pressure sensitive screen such as a capacitive or resistive touchscreen. In some embodiments, display 170 may be implemented using a Liquid Crystal Display (LCD) display or a Light Emitting Diode (LED) display, such as an Organic LED (OLED) display. In other embodiments, display 170 may be a wearable display, which may be operationally coupled to, but housed separately from, other functional units in MS 100. In some embodiments, touchscreen 172 may form part of a user input functional unit or module, which may include a combination of hardware and software components to receive input.

Camera(s) 130 may comprise one or more still and/or video image cameras and may incorporate sensors such as CCD and/or CMOS sensors. For example, image "Hello World" 210 may be captured by camera(s) 130 and displayed on display 170. In some embodiments, camera(s) 130 may be coupled to flashes 138, which may take the form of an electronic flash or other high-intensity illumination devices. In some embodiments, the intensity of flashes 138 may be adjustable based on the ambient illumination and/or configuration settings. For example, in one embodiment, the intensity of flashes 138 may be adjusted, at least in part, by processors 102 based on input from sensors 136, such as, but not limited to, an ambient light sensor. In some embodiments, the duration of flashes 138 may also be adjusted.

Processors 102 may be implemented using a combination of hardware, firmware, and software. In some embodiments, processing unit 102 may include Text Processing Module 116, which may facilitate robust and accurate recovery of words and/or characters from images reliably in the presence of non-uniform spacing in a manner consistent with embodiments disclosed herein.

In some embodiments, Text Processing Module 116 may facilitate robust and accurate recovery of words and/or characters from images, such as image 210 "Hello World". For example, Text Processing Module 116 may apply OCR with MHT techniques to image 210 in a manner consistent with disclosed embodiments. In the example above, Text Processing Module 116 may generate multiple hypotheses based on bifurcation points 220 and 222 in a manner consistent with disclosed embodiments and output words "Hello" and "World" after processing input image 210. In some embodiments, the words "Hello" and "World" may be displayed with uniform spacing on display 170.

More generally, by facilitating word recognition in natural settings, disclosed embodiments may provide contextual indicators for a plethora of tasks. For example, the words "Hello" and "World" may be fed to a language translation application in Text Processing Module 116 and a translation of the words may be output and/or overlaid on display 170 and/or played through a speaker on or coupled to MS 100. For example, MS 100 may use OCR in conjunction with augmented reality (AR) techniques to overlay the translated words over characters in the input image. AR functionality may be provided using processor 102 and/or one or more programs running on processor 102. As another example, a label on a bottle with small text may be read to a visually impaired person or to a person who may not be able to read the script and/or small font. For example, MS 100 may include a speaker and the words "Hello" and "World" or "COLA" may be output audibly through the speaker.

Processors 102 may also be capable of processing other information either directly or in conjunction with one or more other functional blocks shown in FIG. 2. For example, processors 102 may process and combine raw measurements from sensors 136. Sensors 136 may include touch sensors including multi-touch sensors, acoustic sensors such as microphones and speakers, ambient light sensors, and various others, which, in some instances, may be coupled to display 170 and/or touchscreen 172. For example, in one embodiment, input from the ambient light sensor may be used to adjust the brightness of display 170. In some embodiments, processors 102 may represent one or more circuits configurable to perform at least a portion of a computing procedure or process related to Text Processing Module 116 in a manner consistent with disclosed embodiments.

The methodologies described herein may be implemented by various means depending upon the application. For example, these methodologies may be implemented in hardware, firmware, software, or any combination thereof. For a hardware implementation, processors 102 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

For a firmware and/or software implementation, the methodologies may be implemented using procedures, functions, and so on that perform the functions described herein. Any non-transitory machine-readable medium tangibly embodying instructions may be used in implementing the methodologies described herein. Non-transitory computer-readable media may include physical computer storage media. A storage medium may be any available medium that can be accessed by a computer. In one embodiment, software code pertaining to Text Processing Module 816 may be stored in a non-transitory computer-readable medium and read using removable media drive 120 and executed by at least one of processors 102. For example, the methods and/or apparatuses presented herein may take the form in whole or part of a computer-readable medium that may include program code to support Text Processing Module 116 in a manner consistent with disclosed embodiments.

Non-transitory computer-readable media may include a variety of physical computer storage media. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Memory 104 may be implemented within processors 102 and/or external to Processor 102. As used herein the term "memory" refers to any type of long term, short term, volatile, nonvolatile, or other memory and is not to be limited to any particular type of memory or number of memories, or type of media upon which memory is stored. In general, memory 104 may represent any data storage mechanism. Memory 104 may include, for example, a primary memory and/or a secondary memory. Primary memory may include, for example, a random access memory, read only memory, etc. While illustrated in FIG. 2 as being separate from processors 102, it should be understood that all or part of a primary memory may be provided within or otherwise co-located/coupled with processors 102. Memory 104 may hold instructions and data for processors 102, which may used by Text Processing Module 116. For example, memory 104 may hold program code for Text Processing Module 116, databases, lookup tables, font tables, word dictionaries, etc.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium in removable drive 120. In some embodiments, non-transitory computer readable medium may form part of memory 104.

In some embodiments, MS 100 may further include transceiver 109, which may further include a wireless transmitter and receiver and/or other communication interfaces. It should be understood that MS 100 may be any portable electronic device such as a cellular or other wireless communication device, personal communication system (PCS) device, personal navigation device (PND), Personal Information Manager (PIM), Personal Digital Assistant (PDA), digital photographic devices, smartphones, tablet computers, or any other mobile platform that is capable of processing images and/or performing OCR. In some embodiments, an image 210 may be obtained by MS 100 from camera(s) 130, memory 104, removable media 120, another computing device (e.g. a server) coupled to MS 100 and/or another MS. For example, MS 100 may receive image 210 wirelessly through transceiver 109 from a server or another MS coupled MS 100.

Further, exemplary MS 100 may be modified in various ways in a manner consistent with the disclosure, such as, by combining (or omitting) one or more of the functional blocks shown. For example, in some embodiments, MS 100 may comprise one or more of speakers, microphones, transceivers (e.g., wireless network interfaces), Satellite Positioning System (SPS) receivers etc. Further, in certain example implementations, portions of MS 100 may take the form of one or more chipsets, and/or the like. In some embodiments, MS 100 may take the form of a gaming or other device that lacks communication functionality.

MS 100 may include other position determination methods such as object recognition using "computer vision" techniques. For example, an image of local nearby street sign may be captured by MS 100 may be processed by Text Processing Module 116 and the resulting string, which may be a street name, may be used to refine a location of MS 100. For example, the street name may be sent to a map server along with an approximate location and used to determine a location of MS 100.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Figure 3A:
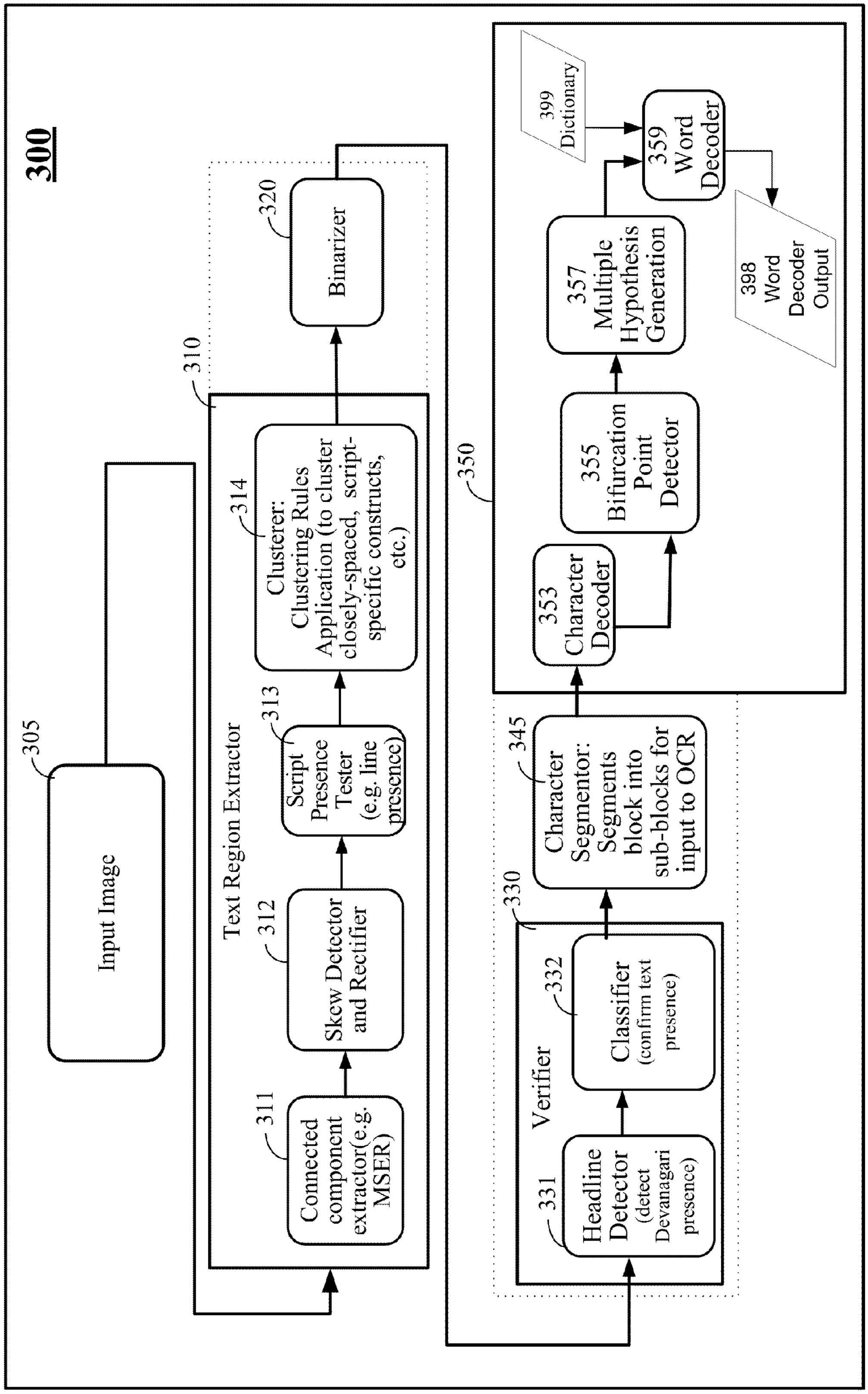
FIG. 3A shows a high level block diagram of modules of an OCR system consistent with disclosed embodiments.

FIG. 3A shows a high level block diagram of modules of an OCR system 300 consistent with disclosed embodiments. In some embodiments, the modules may be implemented by some combination of hardware, software and/or firmware. In some embodiments, system 300 may be implemented on MS 100 and/or a server, desktop, or other computer. For example, in one embodiment, Text Processing Module 116 may include one or more components of system 300.

As shown in FIG. 3A, exemplary OCR system 300, which may operate on input image 305, may comprise text region extractor 310, binarizer 320, verifier 330, segmentor 340, and text recognizer 350. The modules and/or functional blocks shown in FIG. 3A are illustrative and for descriptive purposes only. System 300 may comprise various other modules/functional blocks and/or the functionality associated with the modules/functional blocks may be changed in various ways to achieve functionality consistent with disclosed embodiments. For example, in one embodiment, Text Region Extractor 210 may include binarizer 220 (shown by the dotted lines in FIG. 3A), while text recognizer 350 may include Verifier 330 and Segmentor 340.

Text region extractor 310 may extract one or more regions from input image 305, based, for example, on variations in pixel intensities I(x) for points x in image 305. Text region extractor 310 may comprise connected component extractor 311, skew detector and rectifier 312, script presence tester module 313 and clusterer 314. In some embodiments, text region extractor 310 may determine if the image includes text and merge a plurality of CCs that may be part of a word into a new single clustered connected component. Text may be distinguished from other elements of an image because of almost constant stroke width. Thus, in some embodiments, text region extractor 310 may use stroke width based techniques to identify regions in an image that contain text.

In some embodiments, the input image may be captured by a camera(s) 130 or other imaging devices or obtained by MS 100, and OCR processing on the captured image may be performed in real-time or near real-time by OCR system 300 on the MS. For example, processors 102 may be used in combination with software and/or firmware to implement system 300. In some embodiments, the images may be captured by a camera(s) 130 on an MS 100 and OCR processing on the images may occur on a server operationally coupled to the MS using wired and/or wireless networks. The output of the OCR process may then be sent to the MS 100 by the server.

Connected component extractor 311 may extract connected components from input image 305. Maximally Stable Extremal Regions (MSER) based methods are often used to extract connected components. MSER based methods typically identify regions of contiguous pixel sets (termed "Connected Components"), whose pixel intensities differ from pixel intensities within a region bounded by the Connected Component (CC) by some predetermined threshold, and where the size of the CC is stable across several intensity thresholds. The term "connected component" refers to groups of connected pixels that exhibit similar intensity values. MSERs may be viewed as CCs, where pixels within the CC have either higher or lower intensity than all pixels on the CC. For example, an MSER region may be a set of connected areas of similar intensity, which is surrounded by contrasting background.

MSER techniques may be used to generate a binary image B from input image 305 by considering a plurality of thresholds T, so that for each threshold T, the pixel intensity $P_T(x)$ for a pixel x in binary image B is given by $$P_T(x) = \begin{cases} 1, & I(x) \geq T \\ 0, & \text{otherwise} \end{cases}$$

MSERs are connected regions which are stable over a large number of thresholds. For example, in one embodiment, to determine MSERs, pixels x may be ordered by increasing intensity values I(x). Then, the threshold T may be iteratively increased (e.g. by some value $\Delta_T$) and corresponding pixels may added to the binary image $B_T$ and a list of connected components may be returned. In general, connected components may be extracted by connected component extraction module 311 using any appropriate MSER method.

Skew detector and rectifier 312 may detect if identified MSERs are at angle relative to an axis (skew detection) and then rotate the identified MSERs to align them to the axis correcting skew (skew rectification). For example, after one or more MSERs in an input image are identified by connected component extractor 311, skew detector and rectifier 312 may perform skew presence detection followed by skew rectification. For example, skew detection and rectification module 312 may rotate an image comprising characters so that text in the image lines up along a horizontal axis.

During skew detection, a skew value indicative of skew magnitude $M_i$ local to a specific MSER $Q_i$, may be computed, where Q is the set of MSERs and $Q_i \in Q$. In some embodiments, the skew value for an MSER $Q_i$ may be computed, in part, by using: (i) a rectangle or bounding box that fits MSER $Q_i$, which in some instances, may take the form of a "minimum bounding rectangle" and (ii) a count of pixels in MSER $Q_i$. Thereafter, in some embodiments, a number of angles that are candidates for use as skew may be determined based on locations of pixels within the minimum bounding rectangle/bounding box for MSER $Q_i$. Then, a skew angle relative to the axis that is most common across MSERs among these candidate skew angles, may be identified as the angle of skew of the image. In some embodiments, a value of an indicator of skew for each MSER $Q_i$ may be stored either individually (for each region) or in aggregate (across multiple regions), at a specific location in memory. In some embodiments, the individual skew values may be used to determine whether skew is present globally, in the image as a whole. For example, statistical methods may be used to compute a mean or a median of the multiple values, followed by filtering outliers among the multiple values, followed by re-computation of mean or median of the filtered values and comparison to a threshold to determine whether or not skew in the image as a whole is acceptable. In general, various known techniques for skew detection and rectification may be used to obtain a skew angle. In some embodiments, connected components and/or MSER regions in the image may be rotated by the negative of the skew angle during rectification to correct for the skew.

Next, optionally, exemplary script presence tester 313 may identify features that may be characteristic of a script or a family of scripts to identify text. For example, in many Brahmi scripts, such as the Devanagari family of scripts, a head line (also termed a "shiro-rekha") is used to identify characters that represent a single word. Accordingly, for Devanagari script presence tester 313 may take the form of line presence tester, which may test for the presence of a line of pixels of a common intensity value. In some embodiments, the line presence tester may be used to determine the presence of lines, including head lines or shiro-rekhas in MSERs. In some embodiments, line presence testing module 313 may test a set of pixels aligned along the direction of text for a common intensity value, which may indicate the presence of a line passing through those pixels. In general, script presence tester 313 may comprise code that identifies features that may be characteristic of a script or a family of scripts.

The script presence tester 313 may also reject some of the connected components based on properties such as aspect ratio (ratio of width to height of a bounding box potentially containing text), text density (ratio of number of text pixels in a bounding box potentially containing text to the total number of pixels in the box) and stroke width. For example, in one embodiment, for Roman characters, bounding boxes with an aspect ratio below 0.3 or greater than 4 may be selected. As another example, bounding boxes with text densities below 0.1 or greater than 0.8 may be rejected. In some embodiments, the script presence tester 313 may occur before the skew detector and rectifier 312. As a further example, script presence tester 313 may compute stroke width, which refers to the width of a region that may potentially contain text. A standard deviation or variance in stroke width may be determined based on the width at several points in the region. The stroke width deviation or variance may be tested against predetermined threshold(s). If the stroke width deviation or variance fails the test then the region may be rejected as being unlikely to contain text. In some embodiments, script presence tester 313 may use one or more of the tests outlined above in sequence or in parallel. In some embodiments, script presence tester 313 or one or more of the above tests may be omitted.

In some embodiments, clusterer 314 may merge a plurality of CCs that may be part of a word into a new single clustered connected component. For example, the CCs may be merged when the CCs satisfy a script-specific test, such as a test for line presence. As another example, the CCs may be merged when two or more neighboring CCs are closely-spaced and/or based on a separation that accounts for non-uniformity in inter-CC spacing. Inter-CC spacing may refer to the distance between neighboring CCs, which may measured in pixels. In some embodiments, the CCs may be merged if the inter-CC spacing is below some specified CC separation threshold. Clusterer 314 may use change or modify rules based on the script being processed and/or based on configuration settings and/or user input. For example, configuration settings may specify a separation threshold below which CCs may be clustered. Accordingly, in some embodiments, rules in clusterer 314 may cause the clustering one or more CCs even when they are non-uniformly spaced. In some embodiments, proximity or inter-CC separation based rules may be used for clustering. For example, the character cluster may be obtained based, at least in part, on the CC separation based rules by clustering a set of characters and/or modifiers based on a separation between neighboring characters and/or modifiers in the set. Inter CC separation may be determined along the direction of text. In some instances, inter-CC separation may also be determined orthogonal to the direction of text, for example, in situations where modifiers such as accents, maatras, or other diacritical marks appear above or below text.

Clusterer 314 may also use language or script specific rules to determine clusters. For example, in Devanagari, two or more CCs, which may be part of a single word, may be disconnected because of diacritical marks and/or the use of half-letters. Diacritical marks (which are also called "maatras") may comprise marks to indicate vowel sounds (e.g. ◌ॅ, ◌ं, ◌ु, ◌ृ etc., where the symbol "◌" indicates a base Devanagari character). Diacritical marks, which are typically placed in close proximity to base characters, often lead to more than one CC for a word. As another example, some letters in Devanagari, such as "श" may create a break in the ShiroRekha and lead to two CCs. Further, the use of half-characters such as in the word "फुल्का" may also create a plurality of CCs for a single word. Accordingly, clusterer 314 may use spacing, context, script-based, language dependent, and other rules to cluster a plurality of CCs that are part of a word to form a new single clustered connected component. For example, proximity rules and/or context sensitive rules may be used to cluster modifiers including solo or discontiguous modifiers that part of same word.

For example, in one embodiment, for Devanagari, CCs in one or more MSERs, which satisfy the test for line presence and are located physically adjacent to a first MSER may be merged with a CC in the first MSER. The CCs may be merged, for instance, when they are sufficiently close to one another as indicated by a specific tests and/or conditions. For example, in one embodiment, merging may occur when a distance (or separation) between the CCs is less than a threshold distance, and/or less than the height of the MSERs that satisfy the line presence test. In some embodiments, clusterer 314 may also detect separations between a headline and a diacritical mark and/or other discontiguities and may merge CCs appropriately.

As one example, CCs may be merged when the gap between CCs is not greater than a value given by some threshold (T) multiplied by word height. The value of T may be varied based on degree of non-uniformity in text spacing. For example, threshold T may be set to $T_1=0.5$ in one instance and CCs may be merged when the gap (G) between CCs satisfies $G \leq (0.5^*\text{word height})$. In another instance, threshold T may be set to $T_2=0.75$ and CCs may be merged when $G \leq (0.75^*\text{word height})$. Varying the value of threshold (T) will vary the number of CCs clustered. Higher T values will tend to increase the number of CCs clustered while lower T values will tend to decrease the number of CCs clustered. In some embodiments, the value of T may be varied based on system parameters such as the response time desired, processing power available for later processing of the clustered CCs, degree of non-uniformity detected in the imaged text, configuration settings, and/or user input.

In some embodiments, binarizer 320 may operate on the image output by clusterer 314 based on the text and background information obtained from the MSER blocks to threshold the image into black and white. In some embodiments, binarizer 320 may binarize regions within bounding boxes (clustered or unclustered) output by clusterer 314. In some embodiments, binarizer 320 may form part of text region extractor 310 as shown by the dotted lines.

Verifier 330 may then operate on the binarized image output by block 320. In some embodiments, verifier 330 may comprise headline detector 331, which may verify that a line of pixels of a common binary value is present in the binarized block of a region (whether or not clustered), and classifier module 332, which may classify binarized blocks as text or non-text. In some embodiments, headline detector 331 may use additional criteria to determine the presence of a headline as opposed to the line presence tester in 313, which may use a first set of criteria. For example, in one embodiment, for the Devanagari script, headline detector 331 may use more detailed or stringent criteria to determine the presence of a headline, whereas line presence tester 313 may use more general or relaxed criteria.

In some embodiments, verifier 330 may use various other distinguishing characteristics associated with a language and/or characters in the language to verify the presence of characters in a language. In some embodiments, classifier 332 may take the form of a neural network classifier, which may learn representations of input that determine the presence of characters in a script in the binarize image. In some embodiments, the classification may be based, in part, on variance in stroke width. Text may be distinguished from other elements of an image because of almost constant stroke width. Thus, in some embodiments, verifier 330 may use stroke width based techniques to identify regions in the binarized image that contain text.

In some embodiments, character segmentor 345 may slice a text region, which may be identified by a corresponding text region bounding box, based on language specific rules. As a consequence of the segmentation, a word or sequence of characters in the text region bounding box may be segmented into constituent individual characters. In some embodiments, character segmentor 345 may also characterize the individual characters using feature vectors.

The output of character segmentor 345 may be used by text recognition module 350 to decode and recognize characters and words. In some embodiments, text recognition module 350 may also include one or more of verifier 330 and/or character segmentor 345 as indicated by the dotted line in FIG. 3A. For example, in one embodiment, the feature vectors may be input to multi-stage character decoder 353, which may generate one or more characters as alternatives to one another, optionally with confidence measures for each character in the group as representing a character of text in a specific sub-block. Subsequent stages in multi-stage character decoder 353 may use a variety of techniques including context and/or heuristics along with the confidence measures to resolve any ambiguities.

In some embodiments, a stage in multi-stage character decoder 353 may output a list of segments/feature vectors for each of the connected components. Further, multi-stage character decoder may comprise a subsequent character hypothesis testing stage, which may form and test character related hypotheses based on the list of segments/feature vectors for the connected components. For example, based, in part, on the list of segments/feature vectors, one or more characters (where each potential character represents a hypothesis) may be evaluated as alternatives to one another. In some embodiments, confidence measures or likelihoods may be optionally generated for each hypothesis and one of the character hypotheses may be selected as the most likely character that corresponds to the list of segments/feature vectors.

In some embodiments, a group or cluster of characters processed by character decoder 353 may be input to bifurcation point detector 355, which may determine one or more bifurcation points for the character sequence. In some embodiments, the bifurcation points may be determined based on the separation between characters. The inter-character separation corresponds to the distance between a pair of adjacent characters in the character cluster. For example, the separation between adjacent and/or consecutive characters in the cluster may be used to identify one or more bifurcation points. In some embodiments, one or more locations where the separation between two adjacent/consecutive characters is greater than a separation threshold and/or greater relative to a mean or median separation between characters may be selected as bifurcation points. FIG. 1A shows exemplary bifurcation points 12, 14 and 16; while FIG. 1C shows exemplary bifurcation points 24 and 26, and FIG. 2A shows exemplary bifurcation points 220 and 222. In FIGS. 1A, 1C and 2A, the bifurcation points include points where the separation between consecutive characters may be greater than some inter-character separation threshold or relative to a measure of inter-character separation between other characters in the cluster. In some embodiments, the bifurcation points may be determined by bifurcation point detector 355. Bifurcation points may split a character cluster into a plurality of words.

Figure 3B:
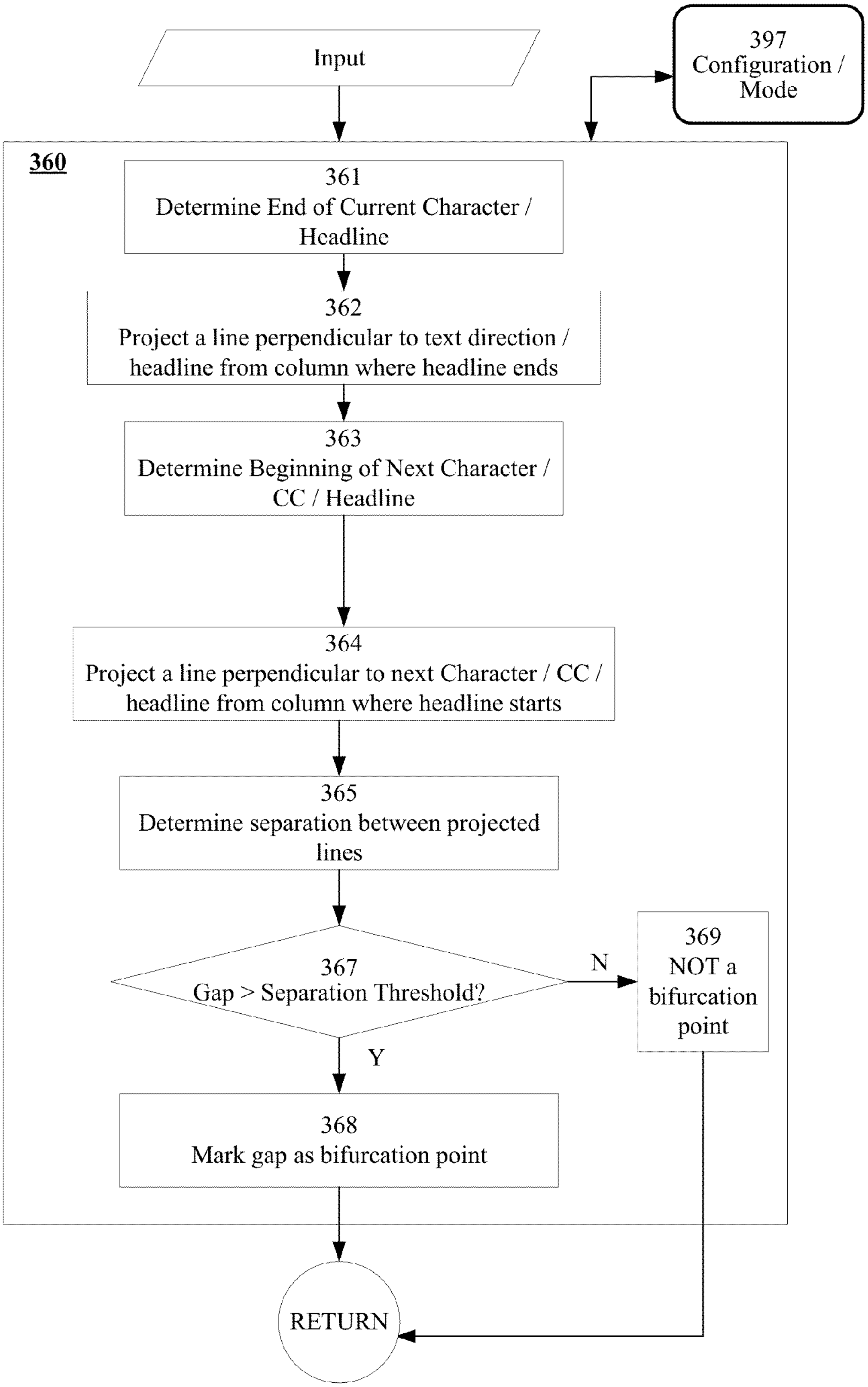
FIG. 3B shows an exemplary routine, which may be used to determine bifurcation points in a character cluster in a manner consistent with disclosed embodiments.

FIG. 3B shows an exemplary routine 360, which may be used to determine bifurcation points in a character cluster in a manner consistent with disclosed embodiments. In some embodiments, routine 360 may form part of and/or be invoked by bifurcation point detector 355. In some embodiments routine 360 may be configurable. In some embodiments, the configuration may depend on a configuration/mode 397 of the OCR system (e.g. system 300). In some embodiments, routine 360 may dynamically change its configuration or mode based on conditions detected during operation and/or processing of input images. The updated configuration may be reflected by appropriate changes to configuration/mode settings 397. In some embodiments, routine 360 may be configured to operate on input, which may comprise some portion of the output of character decoder 353. Routine 360 is described using examples in the Devanagari and Roman scripts, however, it should be noted that the techniques disclosed may be modified and applied to various other scripts.

In some embodiments, in step 361, for a Devanagari or similar script, the end of a headline for the current character/word may be determined. For example, if a headline, which is typically aligned with text and occurs near the top boundary of text, is being processed, then, pixels corresponding to the headline may be located near the top boundary and will also be aligned with the text. Pixels on the headline are likely to have similar pixel intensity values. Therefore, since the headline is contiguous, the end of the headline may be indicated, for example, by a pixel value of zero, or some other low pixel value, or a sudden drop in pixel value.

In some embodiments, in step 361, for the Roman script, such as for the text "Hello World" in image 210, the end of a character may be determined, for example, by (i) determining a character bounding box for each character by using a height-width ratio and/or other geometric information for characters based on the font; and (ii) traversing a characters from left to right and determining the rightmost pixel with a substantial non-zero value within the character bounding box. In some embodiments, several commonly used font characteristics may be stored in a font cache and/or a font table (e.g. in memory 104 of MS 100) and the font table may be used, in part, to determine the height-width ratio for characters and or to infer other geometric information about characters in the script. The geometric information may then be used to determine the rightmost pixel for a character.

As described earlier, in some instances, two or more characters, which may be part of a single word, may be disconnected because of diacritical marks and/or the use of half-letters. For example, letters such as "श " may create a break in the ShiroRekha and/or the use of half-letters such as in the word " फुल्का " may create discontiguities within a character cluster. In instances, where discontiguous diacritical marks, discontiguous letters (e.g. "श ") and/or half-letters create discontiguities, in step 361, the end of the current character may be determined, for example, by traversing pixels along a top boundary of text.

Thus, in step 361, for example, consecutive pixels along the headline/character or within a bounding box may be checked until a first gap pixel whose value is zero or below some intensity threshold is reached.

In step 362, a first line perpendicular or orthogonal to the headline or text direction may be projected from a boundary pixel immediately preceding the gap pixel. The first orthogonally projected line may mark a first (e.g. left) boundary of the headline/character. For example, the first orthogonally projected line may mark the end of the current character.

In step 363, the beginning of the next headline or character is determined. Gap pixels are likely to have zero or low pixel intensity values. Therefore, in one embodiment, pixels consecutive to the first gap pixel along the direction of the text may be checked until a new headline/character or character bounding box pixel whose value is non-zero or above some intensity threshold intensity is reached.

In step 364, a second line orthogonal or perpendicular to the new headline or text direction may be projected from a boundary pixel immediately after the gap pixel. The second orthogonal projected line may mark a next (e.g. right) boundary of the headline/character. For example, the second orthogonally projected line may mark the beginning of the next character.

In step 365, the separation or gap between the first and second projected line is determined. For example, the distance between the first and second projected lines may be used to determine the gap/separation. If the gap is greater than a separation threshold ("Y" in step 367) then, in step 368, the gap may be marked as a bifurcation point. On the other hand, if the gap is not greater than the separation threshold ("N" in step 417), then, in step 369, the gap may not be treated as a bifurcation point.

For example, text "Hello World" in image 210 (FIG. 2), in step 368, points 220 and 222 may be marked as bifurcation points. As another example, for Devanagari, for the character string in binarized image 10 (FIG. 1A), which comprises the Devanagari character cluster "मेरा नाम श्याम ", points 12, 14 and 16 may be marked as bifurcation points in step 368.

In some embodiments, the bifurcation points may be determined along a first direction (e.g. horizontal) aligned with the text (e.g. in steps 361 and 363), while the lines are projected along second direction, which is orthogonal or perpendicular to the first direction (e.g. vertical in steps 362 and 364), and the separation between the headlines/CC/character pair may be determined by measuring the separation between the projected lines along the first (horizontal) direction (e.g. in step 365).

In some embodiments, based in part, on processing by routine 360, one or more bifurcation points may be output by bifurcation point detector 355. In some embodiments, bifurcation point detector 355 and/or bifurcation point detection routine 360 may also output (and/or associate) the actual separation associated with each bifurcation point (e.g. as determined in step 365) along with the set of bifurcation points.

In some embodiments, routine 360 may be configured by default to detect a separation between headlines, but the settings may be dynamically changed during operation to detect the separation between a headline and a diacritical mark, etc. Thus, in some embodiments, during operation, if routine 360 detects that a discontiguous diacritical mark is present in the vicinity of a CC, then, routine 360 may dynamically change its configuration to detect the separation between the diacritical mark and the CC and may update configuration settings/mode 397 appropriately. For example, the distance of one or more diacritical marks may be detected based on a vertical separation (where the vertical separation is determined in a direction orthogonal to the text direction) of the diacritical mark from one or more character clusters and the diacritical mark may be associated with one or more of the character clusters based on the vertical separation.

In some embodiments, routine 360 may be invoked with an appropriate inter-character separation threshold, which may be specified using configuration settings 397 to determine bifurcation points for non-uniformly spaced characters in a manner consistent with disclosed embodiments. In some embodiments, the method may be invoked by MS 100, processor 102 Text Input Module 116, and/or bifurcation point detection module 355. In some embodiments, bifurcation point detection module may form part of word detection module 359. In some embodiments, routine 360 may be shared among one or more of text region extractor 310, clusterer 314, text recognition module 350, bifurcation point detection module 355, and/or Determine Bifurcation Points routine 410.

In some embodiments, Multiple Hypothesis Generator (MHG) 357 may the use the character cluster output by character decoder 353 and bifurcation points (such as bifurcation points 12, 14 and 16) to generate a plurality of hypotheses. Each hypothesis corresponds to selection of bifurcation points. If a first bifurcation point is selected in a character cluster, then, the character cluster is split at that point into two words. The two words may be split further if additional bifurcation points within the two words are selected. If no bifurcation points are selected, then, the character cluster is treated as a single word. In general, for q bifurcation points, because each bifurcation point may take on one of two states—selected or unselected—there are a total of $2^q$ hypotheses. In some embodiments, MHG 357 may generate all hypotheses for a set of bifurcation points. In some embodiments, the number of bifurcation points output by MHG 357 may be limited based on system parameters such as the separation threshold, response time desired, computer resource availability, configuration settings, character cluster size, accuracy desired, etc.

In some embodiments, each hypothesis output by MHG module 357 may be input to word decoder module 359, which may determine a score for each hypothesis. In some embodiments, the score associated with a hypothesis may be determined based on the normalized likelihood of words in the hypothesis. In some embodiments, dictionary 399 may be used, in part, to score and/or determine the normalized likelihood of words in a hypothesis. Dictionary 399 may contain a set of words that may be used, in part, to validate and/or score words output by word decoder 359. In some embodiments, MHG module 357 may be front end of word decoder module.

In general, for a character cluster S with q bifurcation points, each hypothesis $H_k$ where $0 \le k \le 2^q$ may comprise a set of words $W_r$, based on some selected subset of the bifurcation points.

Further, for a word w of word length N, $w \in W_Y$, word decoder module 359 may determine that w comprises character sequence $w = c_1 c_2 \ldots c_i \ldots c_N$, where $1 \le i \le N$ and i represents the position of the character $c_i$ in word w. In some embodiments, the word decoder module 359 may determine the character sequence $w = c_1 c_2 \ldots c_i \ldots c_N$, based, in part, on likelihoods associated with characters identified by multistage character decoder 353.

In some embodiments, once word decoder 359 decodes a character sequence or character string w when evaluating/scoring a hypothesis $H_{k=a}$, the decoded character string w may be reused if it recurs in another hypothesis $H_{k=b}$, $a \ne b$.

In some embodiments, word decoder 359 may select one of the hypotheses, for example hypothesis $H_k$ based, in part, on the score associated with hypothesis $H_k$. In one embodiment, a hypothesis $H_k$ with the highest score may be selected. The selected hypothesis $H_k$ may be output as word decoder output 398. In some embodiments, ties in scores may be broken using various heuristic techniques and/or based on configuration settings and/or by soliciting user input.

Figure 3C:
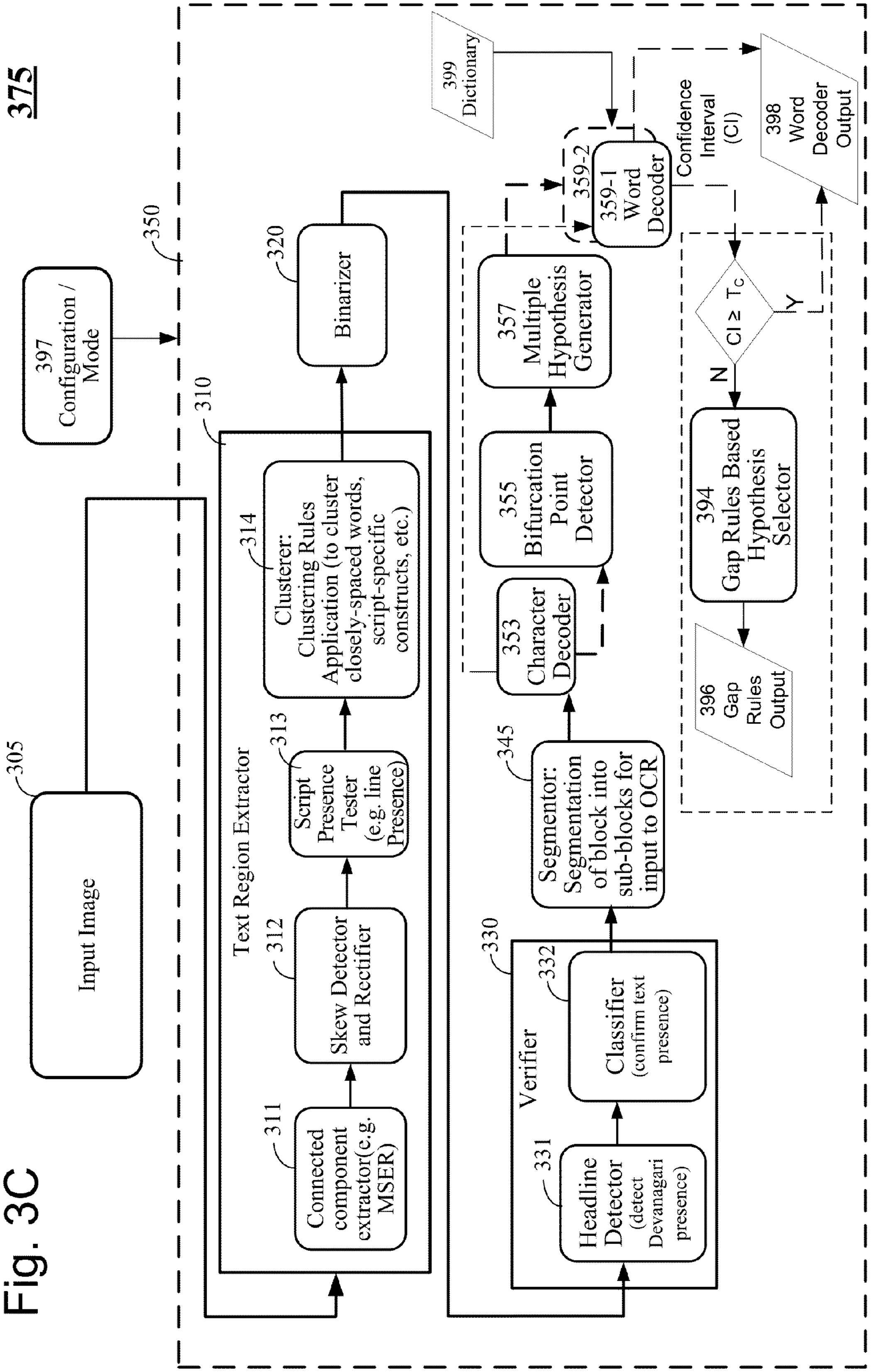
FIG. 3C shows a high level block diagram of modules of another embodiment of an OCR system consistent with disclosed embodiments.

FIG. 3C shows a high level block diagram of modules of another embodiment of an OCR system consistent with disclosed embodiments. In FIG. 3C, modules with the same labels as in FIG. 3A are functionally similar to those described in FIG. 3A. Various configurations of system 375 are discussed below. In FIG. 3C, some of the configurations/modes have been illustrated by dashed lines between the blocks. In some instance, multiple dashed lines have been shown to indicate alternate and/or parallel paths.

In FIG. 3C, system 375 may be configured so that one or more of the blocks shown may be used for both text region extraction and text recognition. For example, system 375 may be architected with a plurality of modules which may be used for both text region extraction and text recognition. In some embodiments, the modules may be configured and/or selectively enabled based on configuration settings/mode 397 and/or may be dynamically configurable based on detected conditions.

In some embodiments, system 375 may be configured in a variety of modes so that one or more modules may be selectively enabled and/or reused with different parameters based on configuration settings/mode 397.

For example, in one configuration, text recognition module 350, Character Decoder 353 and Word Decoder 359 may be enabled, while Bifurcation Point Detection module 355, Multiple Hypothesis Generation module 357 may be disabled. Thus, for example, in one embodiment, system 375 may be configured by default (in a first mode) for use with normally spaced text.

In the event, that unevenly spaced text is detected or expected, system 375 may be configured in a second mode where, in text recognition module 350, Character Decoder 353, Bifurcation Point Detector module 355, Multiple Hypothesis Generator module 357, and Word Decoder 359 may be enabled. Thus, in the second mode, unevenly spaced text may be processed in a manner similar to that discussed above with respect to FIG. 3A. In some embodiments, the second mode may be automatically triggered, for example, if the number of consecutive words not found in dictionary 399 exceeds some threshold.

Further, in some embodiments, system 375 may comprise a plurality of word decoders such as word decoders 359-1 and 359-2 shown in FIG. 3C, which may operate to evaluate/score hypotheses in parallel. In one embodiment, a first instance of word decoder module 359-1 may receive and process input directly from Character Decoder module 353. Concurrently, in parallel, a second instance of word decoder 359-2 may receive and process input from Character Decoder module 353 through a path comprising Bifurcation Point Detector 355 and Multiple Hypothesis Generator module 357. Accordingly, in some embodiments, if the number of consecutive incorrect words output by Word Decoder 359-1 exceeds some threshold, then system 375 may automatically switch to the output of Word Decoder 359-2.

In some embodiments, when in the second mode where Bifurcation Point Detector module 355, Multiple Hypothesis Generator module 357, and Word Decoder 359 are enabled, Word Decoder 359-1 may output a confidence interval (CI) associated with the selected hypothesis $H_k$, which may be the hypothesis with the highest score. In the event that the confidence interval CI exceeds a threshold confidence interval $T_C$ ($CI \geq T_C$), then system 375 may output Word Decoder Output 398.

On the other hand, if $CI < T_C$, then Gap Rules Based Hypothesis Selector 394 may be used to select a hypothesis $H_G$ and system 375 may output Gap Rules Output 396. In some embodiments, Gap Rules Based Hypothesis Selector 394 may use a heuristically determined and/or a predetermined separation threshold to select a hypothesis. For example, the actual separation associated with each bifurcation point in a hypothesis may be tested against the heuristic and/or predetermined separation threshold and the hypotheses may be individually ranked or scored. For example, each hypothesis may be ranked, in part, based on the number of bifurcation points in that hypothesis whose separation is below the heuristic and/or predetermined separation threshold. The highest ranked or highest scoring hypothesis $H_G$ may be selected and output as Gap Rules Output 396.

In some embodiments, based on configuration settings/mode 397 bifurcation point detection module may be configured with: a first separation threshold, which may be used to determine bifurcation points in a character cluster in a first mode; a second separation threshold, which may be used to merge CCs based on the inter-CC separation in a second mode; and a third (e.g. heuristically determined) separation threshold, which may be used to select a hypothesis $H_G$ based on Gap Rules in a third mode.

In general, in some embodiments, system 375 may be configurable so that one or more modules of system 375 may be selectively enabled and/or reused and/or reconfigured depending on the application and/or conditions detected during operation of the OCR system 375.

Figure 3D:
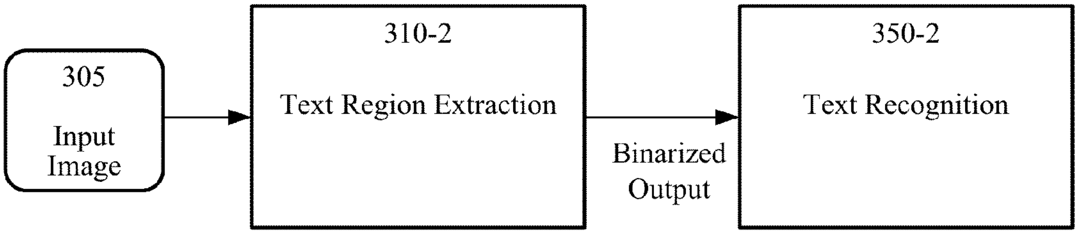
FIGS. 3D, 3E and 3F show various alternative architectures of OCR systems.
Figure 3E:
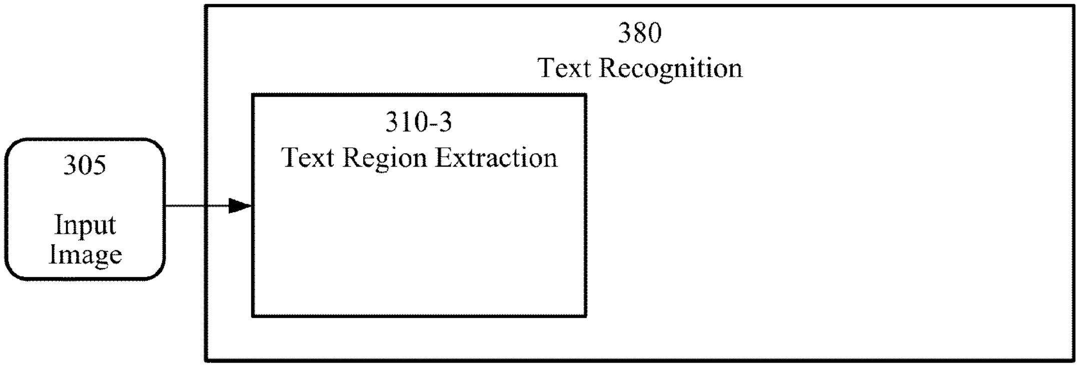
Figure 3F:
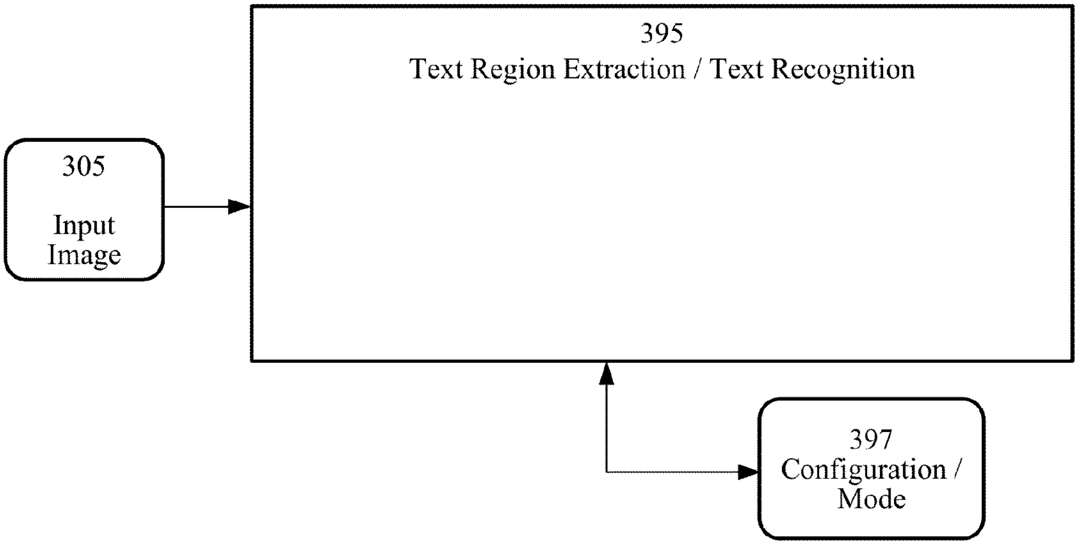

FIGS. 3D, 3E and 3F show various alternative architectures of OCR systems. As shown in FIG. 3D, an OCR system may include a text region extractor 310-2, which produces binarized output that is input to text recognition module 350-2. In FIG. 3E, which shows another architecture of an OCR system, text region extractor 310-3 forms part of a text recognition module 380.

FIG. 3F shows another high level architecture of an OCR system 390 consistent with disclosed embodiments. In general, system 390 may be a configurable system, where the functionality of one or more modules may be shared and/or selectively enabled based on the configuration of system 390. For example, as shown in FIG. 3E, OCR system 390 may comprise one or more modules 395 whose functionality may be selectively shared between text region extraction and text recognition. For example, system 390 may be configured and one or more of modules 395 shared using configuration settings/mode 397 and/or may be dynamically configurable based on detected conditions.

For example, in system 390, routine 360 may be configured by default to detect a separation between CCs using a default separation threshold (e.g. based on the script and/or font) during a text region extraction phase by clusterer 314, but the settings may be dynamically changed during operation to detect uneven separation or non-uniform separation between characters during the text recognition phase. As another example, MHG module 357 may be selectively enabled or disabled based on the presence or absence of non-uniform spacing in images.

Figure 4A:
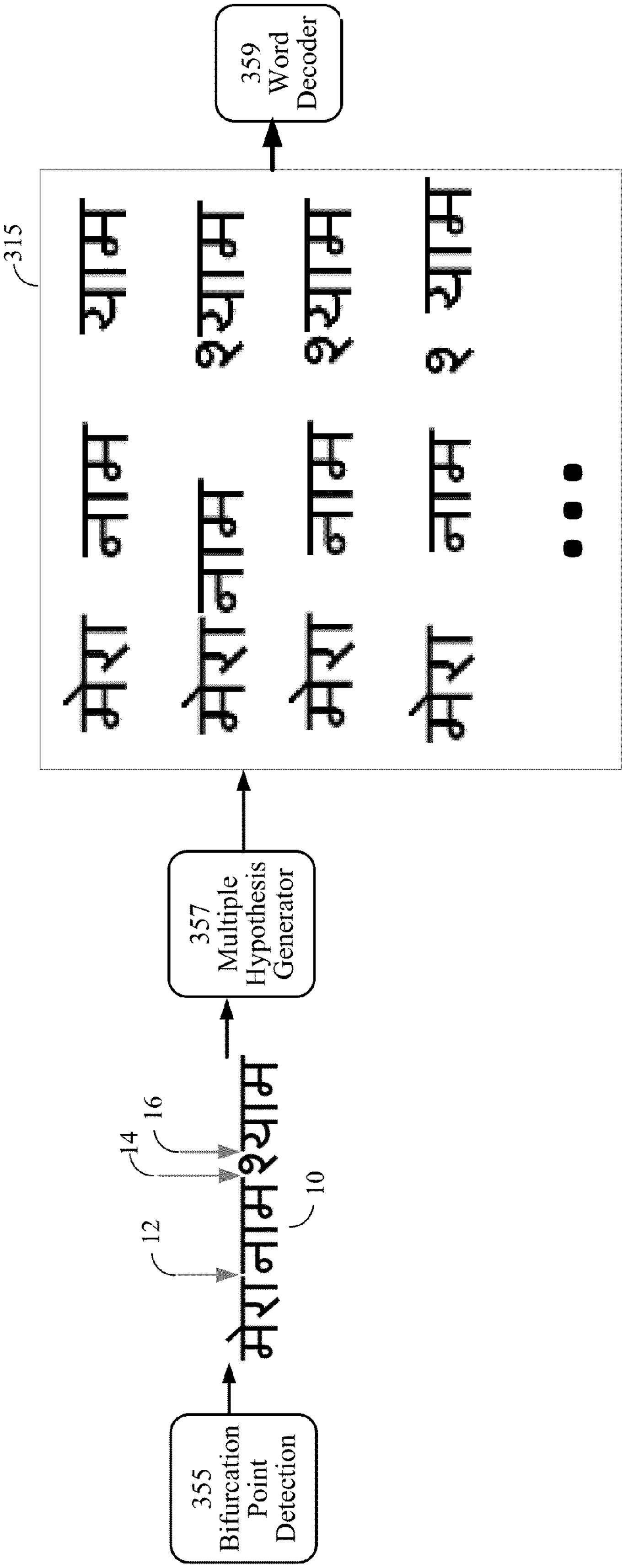
FIG. 4A shows an exemplary flow diagram illustrating the processing of a set of closely spaced characters in a character cluster in a manner consistent with disclosed embodiments.

FIG. 4A shows an exemplary flow diagram illustrating the processing of a set of closely spaced characters in a character cluster S 10 manner consistent with disclosed embodiments. As shown in FIG. 4A, bifurcation point detection module 355 may output bifurcation points 12, 14 and 16 for character cluster S 10, which may be input to MHG 357. MHG 357 may generate a set comprising a plurality of hypotheses 315 by selecting one or more bifurcation points in character cluster S 10. The hypotheses may be evaluated and/or scored by word decoder module 359 and one of the hypotheses $H_k$ may be selected based, in part, on the score associated with hypothesis $H_k$.

Figure 4B:
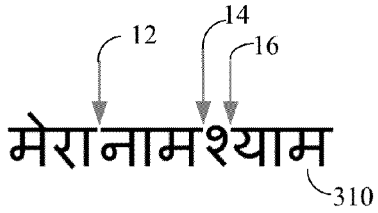
FIG. 4B shows a table with the hypotheses $H_k$ associated with a set of three bifurcation points $b_0$ 12, $b_1$ 14 and $b_2$ 16 for a character cluster.

FIG. 4B shows Table 420 with the hypotheses $H_k$ associated with a set of three bifurcation points $b_0$ 12, $b_1$ 14 and $b_2$ 16 for character cluster S 10. When a bifurcation point is selected character cluster S 10 is divided at that point. For example, when no bifurcation point is selected the character cluster S 10 is not divided and word w="मेरानामशयाम" may form the hypothesis. As another example, when bifurcation points $b_0$ 12 and $b_1$ 14 are selected, the words in the hypothesis are "मेरानाम" "श" and "याम". Similarly, when all bifurcation points b0 12, $b_1$ 14 and $b_2$ 16 for character cluster S 10 are selected, the words in the corresponding hypothesis are "मेरा" "नाम" "श" and "याम".

Figure 4C:
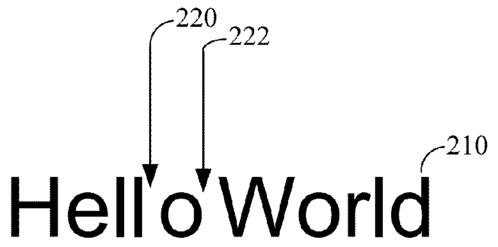
FIG. 4C shows a table with the hypotheses $H_k$ associated with a set of two bifurcation points $b_0$ 220 and $b_1$ 222 for a character cluster.

FIG. 4C shows Table 424 with the hypotheses $H_k$ associated with a set of two bifurcation points $b_0$ 220 and $b_1$ 222 for character cluster S 210. When a bifurcation point is selected character cluster S 210 is divided at that point. For example, when no bifurcation point is selected the character cluster S 210 is not divided and word $w_1$="HelloWorld" may form the hypothesis. As another example, when both bifurcation points $b_0$ 220 and $b_1$ 222 are selected, the words in the hypothesis are $w_2$="Hell", $w_3$="o", and $w_4$="World". Similarly, when only bifurcation point b0 220 for character cluster S 210 is selected, the words in the corresponding hypothesis are $w_2$="Hell" and $w_5$="oWorld". Finally, when only bifurcation point b1 222 for character cluster S 210 is selected, the words in the corresponding hypothesis are $w_6$="Hello" and $w_4$="World".

Figure 4D:
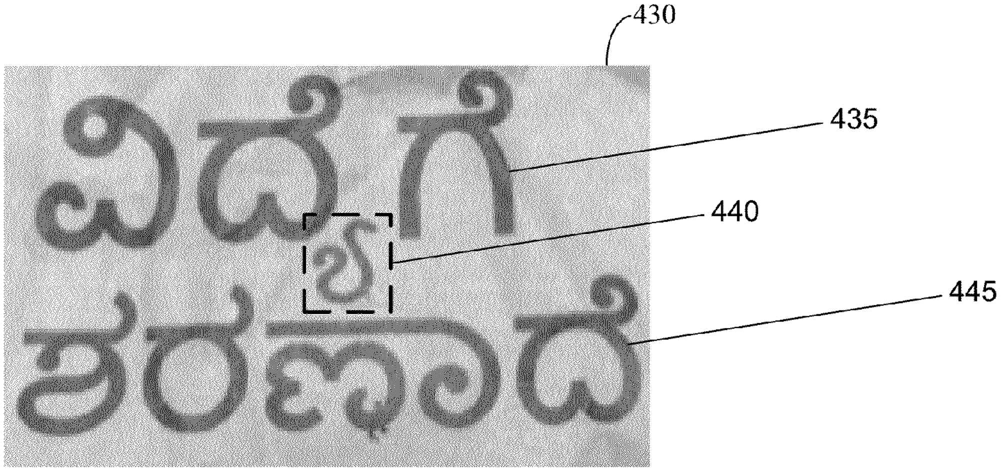
FIG. 4D shows an image of characters in the Kannada script with non-uniform text spacing.

FIG. 4D shows an image 430 of characters in the Kannada script with non-uniform text spacing. The Kannada script is also a part of the larger Brahmi family of scripts. As shown in FIG. 4D, image 430 may comprise two clusters 435 and 445. However, because of non-uniform spacing character or symbol 440 cannot be definitively associated with either cluster.

Accordingly, methods disclosed herein may be applied to resolve ambiguities associated with symbol 440.

In some embodiments, one or more modules in FIGS. 3A and 3C may include functionality to facilitate processing of non-uniformly spaced characters. In some embodiments, ambiguous characters may be flagged by clustering module 314 and associated with a plurality of clusters. Following thresholding by binarizer 320, classifier module 332 may process the clusters without considering the ambiguous characters to verify the presence of characters in the language.

In some embodiments, character segmentor 345 may process the clusters (without the ambiguous characters) and output constituent individual characters of the plurality of clusters.

In some embodiments, the output of character segmentor 345 may be input to character decoder 353, which may decode characters in the clusters. In some embodiments, the flagged characters may not be decoded by character decoder 353 when processing the plurality of clusters associated with the flagged characters. Next, MHG 357 may generate multiple hypotheses based, in part, on the flagged characters.

Figure 4E:
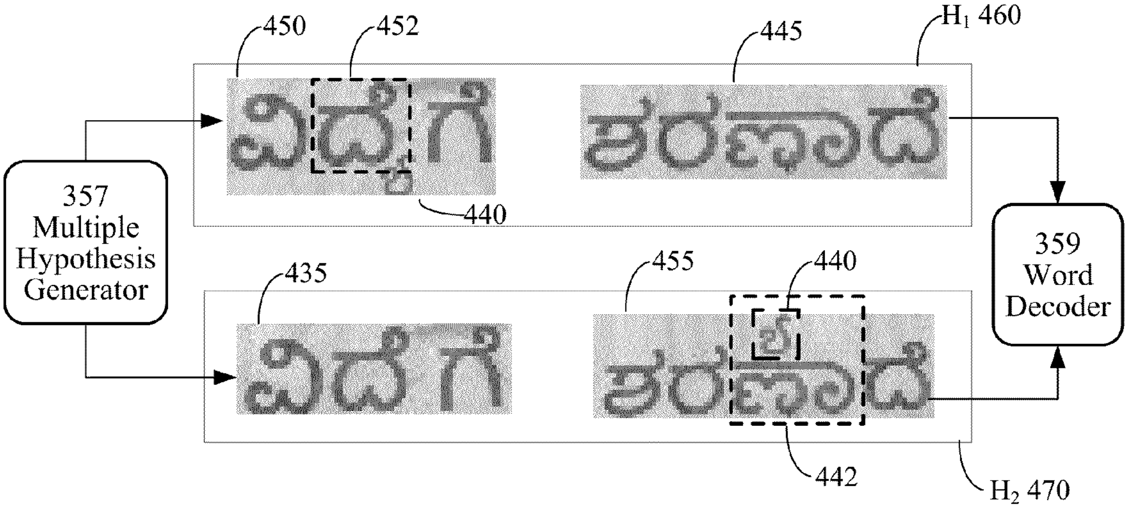
FIG. 4E shows exemplary hypotheses associated with the non-uniformly spaced text in the Kannada script shown in FIG. 4D.

FIG. 4E shows exemplary hypotheses associated with the non-uniformly spaced text in the Kannada script shown in FIG. 4D. In some embodiments, when one or more symbols or characters, such as symbol 440, is associated with a plurality of clusters (for example, because of non-uniform spacing) then, a plurality of hypotheses may be generated by MHG 357 and symbol 440 may be associated with each character cluster in the plurality of character clusters. In some embodiments, symbol 440 may be associated based on its location relative to the clusters and in accordance with any rules associated with the language being processed. For example, as shown in FIG. 4E, the position of symbol 440 relative to the clusters 435 and 445 has not been changed in hypotheses $H_1$ 460 and $H_2$ 470, respectively.

As shown in FIG. 4E, a first hypothesis $H_1$ 460 and a second hypothesis $H_2$ 470 may be generated by MHG 357. Hypothesis $H_1$ 460 may comprise clusters 445 and 450, where character cluster 450 includes symbol 440. Hypothesis $H_2$ 470 may comprise clusters 435 and 455, where character cluster 455 includes symbol 440. In some embodiments, clusters 450 and 455, which include symbol 440, may be reprocessed to determine a core character such as characters 452 and/or 442 associated with the respective cluster.

Hypotheses $H_1$ 460 and $H_2$ 470 may be processed by word decoder module 359. A score may be computed for each of hypotheses $H_1$ 460 and $H_2$ 470 and the hypothesis with the higher score may be selected for further processing and/or output.

Figure 5A:
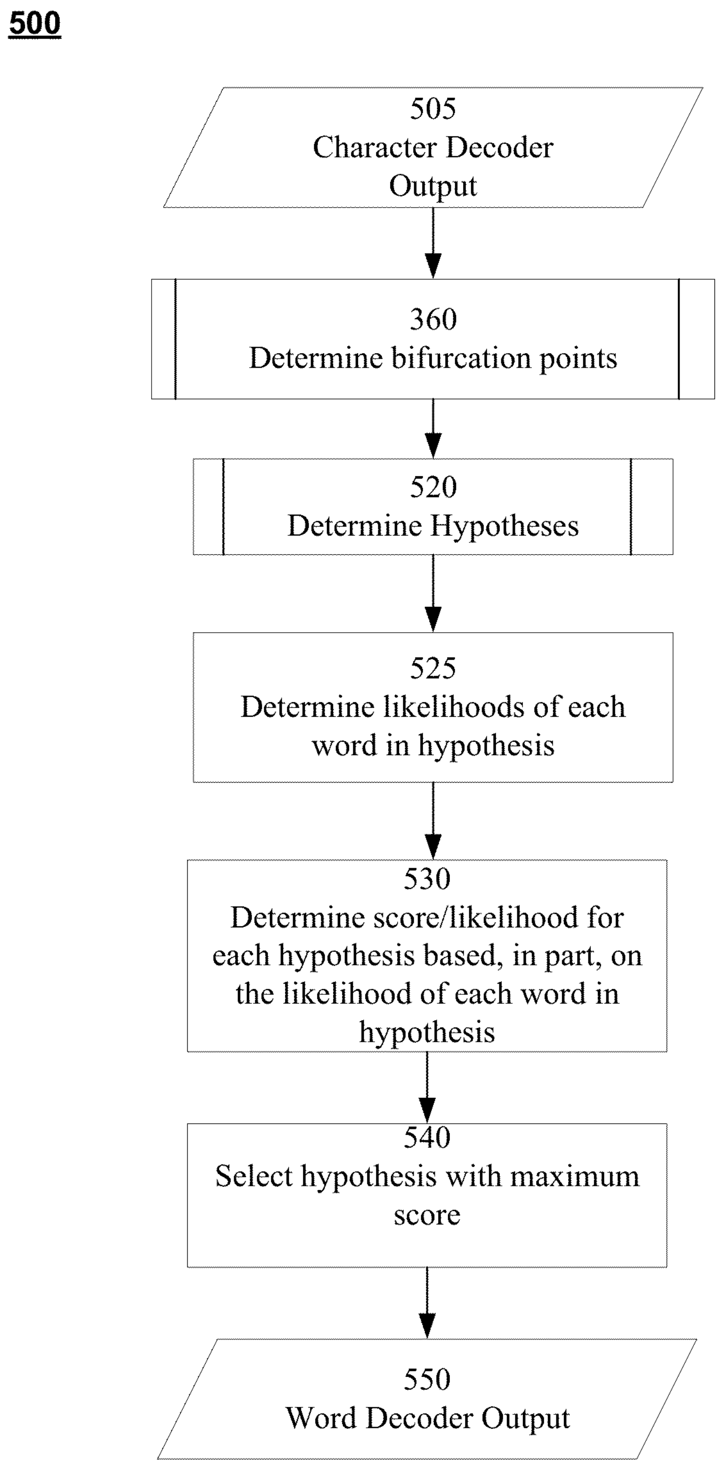
FIG. 5A shows a flowchart for a method 500 of performing OCR for a set of closely or non-uniformly spaced characters in a manner consistent with disclosed embodiments.

FIG. 5A shows a flowchart for a method 500 of performing OCR for a set of closely or non-uniformly spaced characters in a manner consistent with disclosed embodiments. In some embodiments, method 500 may be performed on MS 100. In some embodiments, method 500 may be performed by Text Processing Module 116 on processor(s) 102.

In some embodiments, character decoder output 505 may be input to routine 360, which may determine bifurcation points in character decoder output 505. For example, routine 360 may process character cluster S 10 (FIG. 4A) in character decoder output 505 to determine bifurcation points 12, 14 and 16. In some embodiments, portions of routine 360 may be performed by bifurcation point detection module 355. The process of determining bifurcation points has been detailed earlier in FIG. 3B and the associated description above.

In routine 520, a plurality of hypotheses may be generated based, in part, on bifurcation points determined by routine 360. For example, one or more bifurcation points may be selected from the set of bifurcation points and a hypothesis corresponding to the selected bifurcation points may be generated. In some embodiments, portions of routine 520 may be performed by multiple hypothesis generation module 357.

In step 525, the likelihoods of each word in the hypothesis may be determined. Next, in step 530, a score may be computed for each hypothesis, based, in part, on the likelihood of each word in the hypothesis. An exemplary computation of scores for the hypothesis is illustrated in FIG. 5B.

Figure 5B:
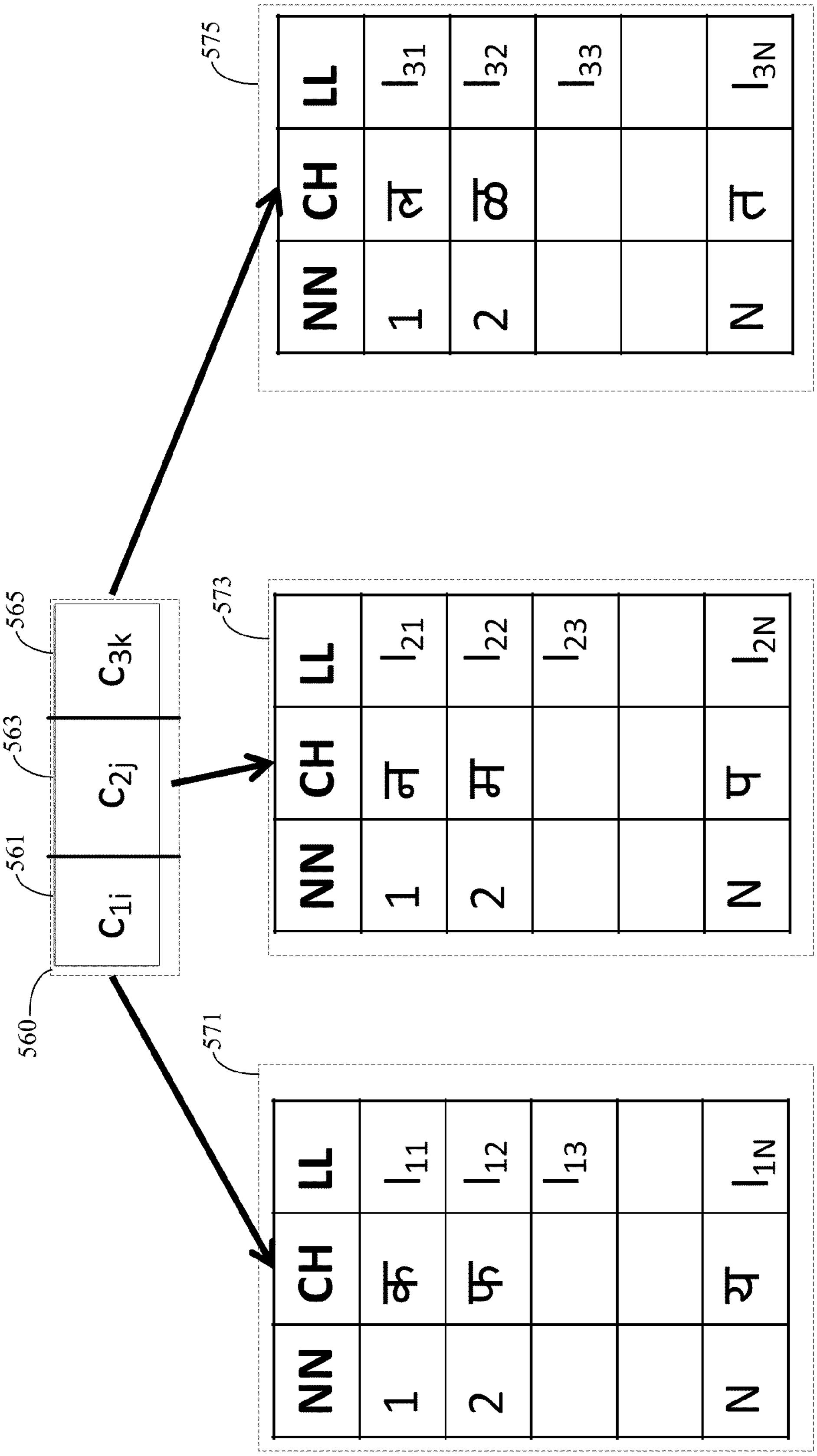
FIG. 5B shows an exemplary computation of scores for a 3 letter word w 460 comprising characters $c_1$, $c_2$, and $c_3$, respectively.

FIG. 5B shows an exemplary computation of scores for a 3 letter word w 560 comprising characters $c_1$, $c_2$, and $c_3$, respectively. As shown in FIG. 5B, word decoder module may associate likelihoods $l_{1i}$, $l_{2j}$, and $l_{3k}$ for candidate or nearest neighbor (NN) characters $c_{1i}$ 561, $c_{2j}$ 563, and $c_{3k}$ 565, respectively, where $1 \le i \le M_1$, $1 \le j \le M_2$, and $1 \le k \le M_3$, and $M_1$, $M_2$, and $M_3$ are the number of alternatives for characters $c_1$, $c_2$, and $c_3$, respectively, as determined by multi-stage character decoder 353.

As shown in FIG. 5B, in Table 571, the NN candidate characters $c_{1i}$ 561 comprise character (CH) "क" with likelihood $l_{11}$, character "फ" with likelihood $l_{12}$, etc. Similarly, in Table 573, the NN candidate characters $c_{2j}$ 563 comprise character "न" with likelihood $l_{21}$, character "म" with likelihood $l_{22}$, etc; while in Table 575, the NN candidate characters $c_{3k}$ 565 comprise character "ल" with likelihood $l_{31}$, character "ळ" likelihood $l_{32}$, etc.

In some embodiments, for the example shown in FIG. 5B, the characters $c_1$, $c_2$, and $c_3$, respectively, that comprise 3-letter word w 460 may be obtained by computing $\{i', j', k'\} = \arg\max_{ijk} l_{1i} l_{2j} l_{3k}$. The function "arg max" obtains the values i', j', and k' of i, j, and k, respectively, for which the function $l_{1i} l_{2j} l_{3k}$ attains its maximum value such that the word $c_{1i} c_{2j} c_{3k}$ belongs to a given dictionary of words such as dictionary 399. The characters $c_1$, $c_2$, and $c_3$ may then be obtained as $c_{1i'}$, $c_{2ij'}$, and $C_{3k'}$, respectively. In some embodiments, a likelihood for word w may be computed as $(l_{1i} l_{2j} l_{3k})^{1/3}$. In some embodiments, multi-stage word decoder may output a confidence interval for each candidate character and the word likelihood may be determined based on the confidence intervals associated with some subset of the candidate characters.

In some embodiments, when determining word likelihoods (in step 525) of each word in the hypothesis based on the likelihood of characters in the word, the most likely candidate character, or those candidate characters with a likelihood above some threshold, or some subset of the likely characters (e.g. the top 2 or 3 most likely candidate characters) may be considered. In some embodiments, various other heuristics may be used to estimate the likelihood of each word in a hypothesis. For example, the likelihood of a word may be estimated by using the most likely character output by multi-stage character decoder and determining a score based on the presence, or absence, or proximity to a word in dictionary 399. For example, a Levenshtein distance relative to words in dictionary 399 may be used as a measure of proximity and a word likelihood computed based on the Levenshtein distance. The Levenshtein distance is a metric to determine the difference between two character sequences and may be viewed as the minimum number of single-character edits (i.e. insertions, deletions or substitutions) required to change one word into the other.

Figure 5C:
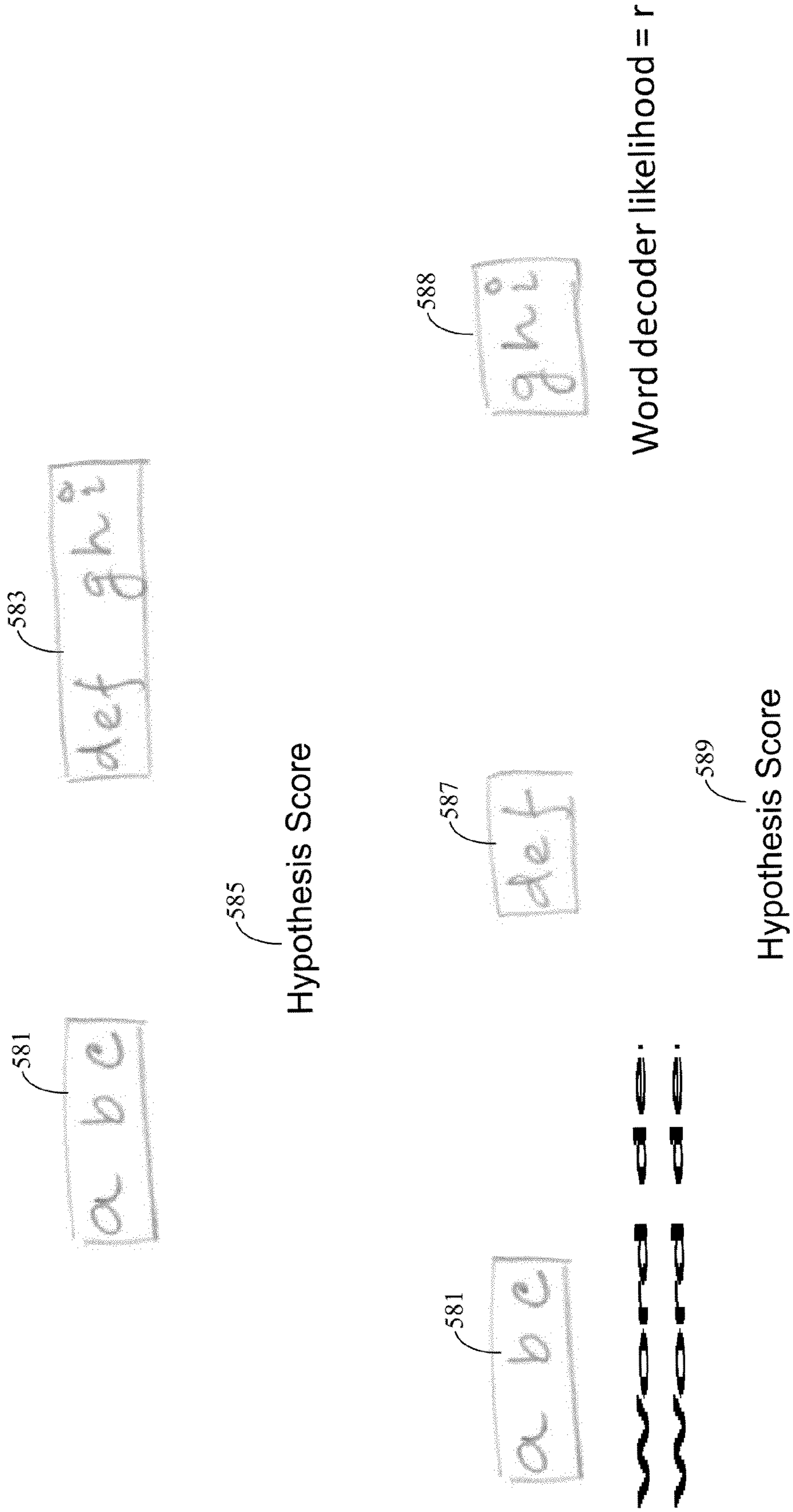
FIG. 5C shows an exemplary computation of a normalized score for a character cluster given by characters "abcdefghi".

FIG. 5C shows an exemplary computation of a normalized score for a character cluster given by characters "abcdefghi". As shown in FIG. 5C, character cluster "abcdefghi" may comprise words "abc" 581 of length 3 and "def ghi" 583 of length 6. The words may be obtained from the character cluster "abcdefghi" of length 9 based on selected bifurcation points. As shown in FIG. 5D, if the word likelihood for word "abc" 581 is p and the word likelihood for word "def ghi" 583 is q. Then, as shown in FIG. 4D, the normalized score 585 for hypothesis $H_1$ comprising words 581 and 583 may be calculated as $(p^3q^6)^{1/9}$.

Similarly, for a character cluster given by characters "abcdefghi" of length 9 and a hypothesis $H_2$ comprising words "abc" 581 with word likelihood p, "def" 587 with word likelihood q and "ghi" 588 with word likelihood r, each of length 3, a normalized score 589 may be computed as $(p^3q^3r^3)^{1/9}$.

In some embodiments, the likelihood p for word "abc" 481, which is common to hypotheses $H_1$ and $H_2$, and was computed for $H_1$ may be stored in memory and reused during the computation of $H_2$, thereby achieving computational efficiencies. In general, for a character cluster S with q bifurcation points, there are $$\frac{(q+1)(q+2)}{2}$$

unique words. Thus, once the likelihoods for each of these words have been calculated, the likelihood corresponding to a word may be reused when the word occurs in another hypothesis.

Further, for a word w of word length N, $w \in W_r$, that comprises character sequence $w=c_1c_2 \ldots c_i \ldots c_N$, where $1 \leq i \leq N$ and i represents the position of the character $c_i$ in word w. In some embodiments, the character sequence $w=c_1c_2 \ldots c_i \ldots c_N$, may be determined, based, in part, on likelihoods associated with characters.

In general, the normalized score for a hypothesis H from a character cluster S of length $d_s$ comprising words $w_1 \ldots w_n$ with likelihoods $l_{w1} \ldots l_{wn}$ & lengths $d_{w1} \ldots d_{wn}$ may be computed as $T_H=(l_{w1}^{d_{w1}} \ldots l_{wn}^{d_{wn}})^{1/d_s}$.

FIG. 5D shows an exemplary computation of a normalized score for a character cluster given by characters "Hello World". As shown in Table 592 in FIG. 5D, character cluster "Hello World" may comprise words "Hell" with likelihood x, "o" with likelihood y, "World" with likelihood z, "oWorld" with likelihood u, "Hello" with likelihood v, "HelloWorld" with likelihood t.

Table 594 in FIG. 5D shows the hypothesis score for the hypotheses shown in Table 524 (in FIG. 4C). As shown in Table 594, the words in the hypothesis are $w_2$="Hell", $w_3$="o", and $w_4$="World" when both bifurcation points $b_0$ 220 and $b_1$ 222 are selected and the hypothesis score is given by $$(x^4y^1z^5)^{\frac{1}{10}}.$$

When only bifurcation point b0 220 for character cluster S 210 is selected, the words in the corresponding hypothesis are $w_2$="Hell" and $w_5$="oWorld" and the hypothesis score is given by $$(x^4u^6)^{\frac{1}{10}}.$$

When only bifurcation point b1 222 for character cluster S 210 is selected, the words in the corresponding hypothesis are $w_6$="Hello" and $w_4$="World" and the hypothesis score is given by $$(v^5z^5)^{\frac{1}{10}}.$$

When no bifurcation point is selected the character cluster S 210 is not divided and word $w_1$="HelloWorld" may form the hypothesis with a hypothesis score of $$(t^{10})^{\frac{1}{10}} = t.$$

Referring to FIG. 5A, in some embodiments, a score may be computed for each hypothesis based on the likelihood of each word in the hypothesis in step 530. In some embodiments, the score for a hypothesis may be determined based, in part, on the presence, absence, or proximity of one or more words in the hypothesis to words in a dictionary. For example, both words "Hello" and "World" may be present in the dictionary, therefore, the hypothesis "Hello World" may receive a higher score than other hypotheses. As another example, for the hypothesis with the words "Hell", "o" and "World," the words "Hell" and "World" may be present, while the word "o" may be absent. Therefore, the hypothesis "Hell o World," where one word "o" is absent from the dictionary may receive a lower score than "the hypothesis "Hello World" where all words are present in the dictionary.

In step 540, the hypothesis with the maximum score may be selected as word decoder output 450.

Figure 6:
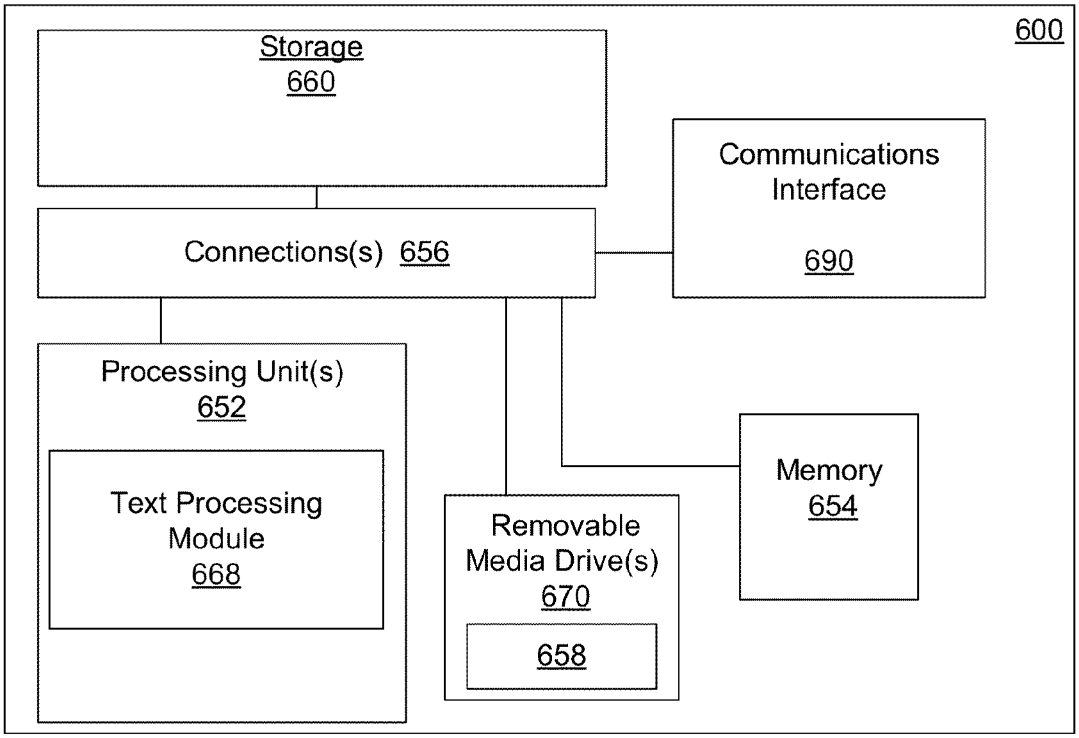
FIG. 6, shows a block diagram illustrating a computing device enabled to facilitate robust and accurate recovery of words and/or characters reliably in the presence of non-uniform spacing in a manner consistent with embodiments disclosed herein.

Reference is now made to FIG. 6, which is a schematic block diagram illustrating a computing device 600 enabled to facilitate robust and accurate recovery of words and/or characters reliably in the presence of non-uniform spacing in a manner consistent with embodiments disclosed herein. In some embodiments, computing device 600 may take the form of a server, desktop computer, workstation or other device. In some embodiments, computing device 600 may include, for example, one or more processing units 652, memory 654, storage 660, and (as applicable) communications interface 690 (e.g., wireline or wireless network interface), which may be operatively coupled with one or more connections 656 (e.g., buses, lines, fibers, links, etc.). In certain example implementations, some portion of computing device 600 may take the form of a chipset, and/or the like. In some embodiments, computing device 600 may be wirelessly coupled to one or more MS' 100 over a wireless network (not shown), which may one of a WWAN, WLAN or WPAN. For example, in one embodiment, computing device 600 may receive images (e.g. image 210) captured by a camera(s) 130 on MS 100 for processing and may process the images to recover of words and/or characters reliably in the presence of non-uniform lighting and/or shadows.

In some embodiments, computing device 600 may implement one or more of portions of system 300 or 375, and/or methods 360 and 500 in a manner consistent with disclosed embodiments. In some embodiments, the above methods may be performed by processing units 652 and/or Text Processing Module 668 based on images obtained by computing device 600. For example, the above methods may be performed in whole or in part by processing units 652 and/or Text Processing Module 668 in conjunction with one or more functional units on computing device 600 and/or in conjunction with MS 100. For example, computing device 600 may receive a sequence of captured images from MS 100 and may perform portions of one or more of systems 200 or 275, and/or methods 360 and 500 in whole, or in part, using Text Processing Module 668.

Communications interface 690 may include a variety of wired and wireless connections that support wired transmission and/or reception and, if desired, may additionally or alternatively support transmission and reception of one or more signals over one or more types of wireless communication networks. Communications interface 690 may include interfaces for communication with MS 100 and/or various other computers and peripherals. For example, in one embodiment, communications interface 690 may comprise network interface cards, input-output cards, chips and/or ASICs that implement one or more of the communication functions performed by computing device 600. In some embodiments, communications interface 690 may also interface with MS 100 to send processed output, and/or receive images, data and/or instructions related to one or more of systems 300 or 375, and/or methods 360 and 500. In some embodiments, communications interface 690 may be coupled to a camera, scanner, and/or another imaging device and may receive images from the coupled device(s) comprising text for processing.

Processing units 652 may use some or all of the obtained information to perform the requested computations and/or to send the requested information and/or results to MS 100 via communications interface 690. In some embodiments, processing units 652 may be implemented using a combination of hardware, firmware, and software. In some embodiments, processing unit 652 may include Text Processing Module 668, which may implement one or more of portions of system 300 or 375, and/or methods 360 and 500 in a manner consistent with disclosed embodiments by processing obtained images. In some embodiments, processing unit 652 may represent one or more circuits configurable to perform at least a portion of a data signal computing procedure or process related to the operation of computing device 600.

For example, Text Processing Module 668 may implement OCR and/or portions of system 200, and/or methods 300, 310, 340, 600, 625, and/or 650 based on obtained images. In some embodiments, one or more of the methods above may be invoked during the course of execution of various AR and/or OCR based applications.

The methodologies described herein in flow charts and message flows may be implemented by various means depending upon the application. For example, these methodologies may be implemented in hardware, firmware, software, or any combination thereof. For a hardware implementation, the processing unit 652 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 670, which may support the use of non-transitory computer-readable media 658, including removable media. Program code may be resident on non-transitory computer readable media 658 or memory 654 and may be read and executed by processing units 652. Memory may be implemented within processing units 652 or external to the processing units 652. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 658 and/or memory 654. Examples include computer-readable media encoded with a data structure and computer-readable media encoded with a computer program. For example, non transitory computer-readable medium 658 including program code stored thereon may include program code to facilitate robust and accurate recovery of words and/or characters reliably in the presence of non-uniform lighting and/or shadows in a manner consistent with embodiments disclosed herein.

Computer-readable media may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 654, storage 660 and/or relayed the instructions/data to processing units 652 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 654 may represent any data storage mechanism. Memory 654 may include, for example, a primary memory and/or a secondary memory. Primary memory may include, for example, a random access memory, read only memory, nonvolatile RAM, etc. While illustrated in this example as being separate from processing unit 652, it should be understood that all or part of a primary memory may be provided within or otherwise co-located/coupled with processing unit 652. Secondary memory may include, for example, the same or similar type of memory as primary memory and/or storage 660 such as one or more data storage devices 660 including, for example, hard disk drives, optical disc drives, tape drives, a solid state memory drive, etc. In some embodiments, storage 660 may comprise one or more databases, lookup tables (LUTs), font tables, configuration settings, and/or other files that may hold information to facilitate OCR, which may include robust and accurate recovery of words and/or characters reliably in the presence of non-uniform lighting and/or shadows in a manner consistent with embodiments disclosed herein. In some embodiments, information in the databases, LUTs, etc may be read, used and/or updated by processing units 652 and/or Text Processing Module 668 during various computations.

In certain implementations, secondary memory may be operatively receptive of, or otherwise configurable to couple to a computer-readable medium 658. As such, in certain example implementations, the methods and/or apparatuses presented herein may be implemented in whole or in part using non transitory computer readable medium 658 that may include with computer implementable instructions stored thereon, which if executed by at least one processing unit 652 may be operatively enabled to perform all or portions of the example operations as described herein. In some embodiments, computer readable medium 658 may be read using removable media drive 670 and/or may form part of memory 654.

Although the present disclosure is described in relation to the drawings depicting specific embodiments for instructional purposes, the disclosure is not limited thereto. Various adaptations and modifications may be made without departing from the scope. Therefore, the spirit and scope of the appended claims should not be limited to the foregoing description.

What is claimed is:

1. A processor implemented method for determining words in a character sequence output during Optical Character Recognition (OCR), the method comprising:

determining a set of one or more bifurcation points for the character sequence, wherein each bifurcation point identifies a location to split the character sequence into two or more words and wherein the one or more bifurcation points are determined based on a separation between adjacent characters in the character sequence;

generating a plurality of hypotheses, each hypothesis comprising one or more words formed by the character sequence, at least one of the hypotheses being generated based on the one or more bifurcation points;

computing a plurality of normalized scores, each normalized score corresponding to a hypothesis, wherein the normalized score for a corresponding hypothesis is based, in part, on a length of each word in a set of the one or more words associated with the corresponding hypothesis; and selecting a hypothesis from the plurality of hypotheses based on a corresponding normalized score associated with the selected hypothesis.

2. The method of claim 1, wherein computing a normalized score in the plurality of normalized scores comprises:

determining, for each word in the set of the one or more words associated with the corresponding hypothesis, a corresponding word likelihood; and computing the normalized score for the corresponding hypothesis based, in part, on the word likelihoods of the words in the set of the one or more words associated with the corresponding hypothesis.

3. The method of claim 2, wherein determining the word likelihood associated with each word in the set of the one or more words associated with the corresponding hypothesis comprises:

obtaining a character likelihood for each character in a word in the set of the one or more words; and determining a likelihood for the word based, in part, on character likelihoods corresponding to characters in the word.

4. The method of claim 3, wherein the method is performed by a text processing module comprising a character detection module coupled to a word decoding module, wherein:

the character detection module outputs the character sequence and the character likelihood for each character in the character sequence; and the word decoding module obtains, from the character detection module, the character likelihood corresponding to each character in the word and determines the word likelihood for the word.

5. The method of claim 2, wherein determining the word likelihood associated with each word in the set of the one or more words associated with a hypothesis comprises:

associating, with each word in the set of the one or more words, a corresponding measure of proximity relative to words in a dictionary; and determining a likelihood for each word in the set of the one or more words based, in part, on the corresponding measure of proximity.

6. The method of claim 5, wherein a Levenshtein distance relative to words in the dictionary is used as the measure of proximity corresponding to each word in the set of the one or more words.

7. The method of claim 1, wherein determining the set of one or more bifurcation points for the character sequence comprises:

determining a plurality of inter-character separations, each inter-character separation corresponding to a distance between a pair of adjacent characters in the character sequence; and selecting, as the one or more bifurcation points, inter-character separations in the plurality of inter-character separations that exceed a first threshold separation.

8. The method of claim 7, wherein the first threshold separation is dynamically configurable.

9. The method of claim 1, further comprising:

displaying the selected hypothesis, when a confidence interval associated with the selected hypothesis exceeds a confidence interval threshold.

10. The method of claim 9, further comprising:

determining, for each hypothesis, a corresponding set of inter-character separations between a pair of characters adjoining each bifurcation point;

displaying an alternate hypothesis, wherein the alternate hypothesis is selected based on a comparison of inter-character separations in the corresponding set of inter-character separations with a second threshold separation.

11. An apparatus comprising:

a processor configured to:

determine a set of one or more bifurcation points for a character sequence output during Optical Character Recognition (OCR), wherein each bifurcation point identifies a location to split the character sequence into two or more words and wherein the one or more bifurcation points are determined based on a separation between adjacent characters in the character sequence;

generate a plurality of hypotheses comprising one or more words formed by the character sequence, at least one of the hypotheses being generated based on the one or more bifurcation points compute a plurality of normalized scores, each normalized score corresponding to a hypothesis, wherein the normalized score for a corresponding hypothesis is based, in part, on a length of each word in the set of the one or more words associated with the corresponding hypothesis; and select a hypothesis from the plurality of hypotheses based on a corresponding normalized score associated with the selected hypothesis.

12. The apparatus of claim 11, wherein to compute a normalized score in the plurality of normalized scores, the processor is configured to:

determine, for each word in the set of the one or more words associated with the corresponding hypothesis, a corresponding word likelihood; and compute the normalized score for the corresponding hypothesis based, in part, on the word likelihoods of the words in the set of the one or more words associated with the corresponding hypothesis.

13. The apparatus of claim 12, wherein to determine the word likelihood associated with each word in the set of the one or more words associated with the corresponding hypothesis, the processor is configured to:

obtain a character likelihood for each character in a word in the set of the one or more words; and determine a likelihood for the word based, in part, on character likelihoods corresponding to characters in the word.

14. The apparatus of claim 13, wherein the processor comprises:

a text processing module comprising a character detection module coupled to a word decoding module, wherein:

the character detection module is configured to output the character sequence and the character likelihood for each character in the character sequence; and the word decoding module is configured to obtain the character likelihood corresponding to each character in the word and determine the word likelihood for the word.

15. The apparatus of claim 12, wherein to determine the word likelihood associated with each word in the set of the one or more words associated with a hypothesis, the processor is configured to:

associate, with each word in the set of the one or more words, a corresponding measure of proximity, the measure of proximity being determined relative to words in a dictionary; and determine a likelihood for each word in the set of the one or more words based, in part, on the corresponding measure of proximity.

16. The apparatus of claim 15, wherein a Levenshtein distance relative to words in the dictionary is used as the measure of proximity corresponding to each word in the set of the one or more words.

17. The apparatus of claim 11, wherein to determine the set of the one or more bifurcation points for the character sequence, the processor is configured to:

determine a plurality of inter-character separations, each inter-character separation corresponding to a distance between a pair of adjacent characters in the character sequence; and select, as the one or more bifurcation points, inter-character separations in the plurality of inter-character separations that exceed a first threshold separation.

18. The apparatus of claim 17, wherein the processor is configured to dynamically configure the first threshold separation.

19. The apparatus of claim 11, wherein the processor is further configured to:

initiate the display of the selected hypothesis, when a confidence interval associated with the selected hypothesis exceeds a confidence interval threshold;

determine, for each hypothesis, a corresponding set of inter-character separations between a pair of characters adjoining each bifurcation point; and initiate the display of an alternate hypothesis, wherein the processor is configured to select the alternate hypothesis based on a comparison of inter-character separations in the corresponding set of inter-character separations with a second threshold separation.

20. An apparatus comprising:

processing means, the processing means further comprising:

means for determining a set of one or more bifurcation points for a character sequence output from Optical Character Recognition (OCR), wherein each bifurcation point identifies a location to split the character sequence into two or more words and wherein the one or more bifurcation points are determined based on a separation between adjacent characters in the character sequence;

generating a plurality of hypotheses comprising one or more words formed by the character sequence, at least one of the hypotheses being generated based on the one or more bifurcation points means for computing a plurality of normalized scores, each normalized score corresponding to a hypothesis, wherein the normalized score for a corresponding hypothesis is based, in part, on the length of each word in the set of the one or more words associated with the corresponding hypothesis; and means for selecting a hypothesis from the plurality of hypotheses based on a corresponding normalized score associated with the selected hypothesis.

* * * * *

UNITED STATES PATENT AND TRADEMARK OFFICE

CERTIFICATE OF CORRECTION

PATENT NO. : 9,152,871 B2
APPLICATION NO. : 14/268904
DATED : October 6, 2015
INVENTOR(S) : Rajiv Soundararajan et al.

It is certified that error appears in the above-identified patent and that said Letters Patent is hereby corrected as shown below:

In the claims,

In column 28, line 34, in claim 20, before “generating” insert -- means for --.

Signed and Sealed this
Sixteenth Day of February, 2016

Michelle K. Lee

Michelle K. Lee
*Director of the United States Patent and Trademark Office*